United States Patent
Braddy et al.

(10) Patent No.: US 10,992,587 B2
(45) Date of Patent: *Apr. 27, 2021

(54) AUTOMATED DATA FLOWS USING FLOW-BASED DATA PROCESSOR BLOCKS

(71) Applicant: SoftNAS Operating Inc., Houston, TX (US)

(72) Inventors: Rick Gene Braddy, Houston, TX (US); Pasqualino Ferrentino, Asti-At (IT)

(73) Assignee: BUURST, INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/746,032

(22) Filed: Jan. 17, 2020

(65) Prior Publication Data

US 2020/0153744 A1 May 14, 2020

Related U.S. Application Data

(63) Continuation of application No. 15/973,278, filed on May 7, 2018, now Pat. No. 10,541,930, which is a (Continued)

(51) Int. Cl.
*H04L 12/825* (2013.01)
*H04L 29/08* (2006.01)
(Continued)

(52) U.S. Cl.
CPC ............. *H04L 47/25* (2013.01); *H04L 67/28* (2013.01); *H04L 67/2823* (2013.01); *H04L 43/0829* (2013.01); *H04L 43/0852* (2013.01); *H04L 43/10* (2013.01); *H04L 47/32* (2013.01); *H04L 67/1097* (2013.01); *H04L 69/16* (2013.01)

(58) Field of Classification Search
CPC ..... H04L 47/25; H04L 67/28; H04L 67/2823; H04L 47/32; H04L 43/10; H04L 67/1097; H04L 69/16; H04L 43/0829; H04L 43/0852

See application file for complete search history.

(56) References Cited

U.S. PATENT DOCUMENTS 7,257,816 B2 * 8/2007 Kulp ................. G06F 9/5044
709/226
7,873,060 B2 * 1/2011 Luo ................. H04L 12/4633
370/401

(Continued)

*Primary Examiner* — Patrice L Winder
(74) *Attorney, Agent, or Firm* — Polsinelli PC

(57) ABSTRACT

Systems and methods for a flow-based data processing can begin with receiving a selection of a plurality of data processor blocks and a configuration mapping corresponding to the inputs and outputs of each data processor block. At a first compute node associated with a selected data source, an automated data flow can be initiated, wherein the automated data flow is generated from the configuration mapping and comprises a continuous sequence of one or more of the selected plurality of data processor blocks. Data from the selected data source is ingested into the automated data flow and is transformed by the continuous sequence of data processor blocks. The transformed ingested data is transmitted from the automated data flow to a second compute node associated with a selected data destination, via a data accelerator.

22 Claims, 11 Drawing Sheets

Related U.S. Application Data continuation-in-part of application No. 15/249,104, filed on Aug. 26, 2016, now Pat. No. 10,057,176.

(60) Provisional application No. 62/211,401, filed on Aug. 28, 2015.

(51) Int. Cl.
*H04L 29/06* (2006.01)
*H04L 12/26* (2006.01)
*H04L 12/823* (2013.01)

(56) References Cited

U.S. PATENT DOCUMENTS

| | | | |
|---|---|---|---|
| 7,917,911 B2* | 3/2011 | Bansal | G06F 11/3447 719/313 |
| 8,060,391 B2* | 11/2011 | Freire | G06Q 10/10 705/7.11 |
| 8,112,471 B2* | 2/2012 | Wei | H04L 67/1002 709/202 |
| 8,112,513 B2* | 2/2012 | Margulis | G06F 3/14 709/224 |
| 8,140,647 B1* | 3/2012 | Juillard | H04L 67/06 709/219 |
| 8,144,590 B2* | 3/2012 | Broberg | H04L 47/25 370/235 |
| 8,296,424 B2* | 10/2012 | Malloy | H04L 41/145 709/224 |
| 8,463,941 B1* | 6/2013 | Welch | H04L 67/1097 709/239 |
| 8,520,672 B2* | 8/2013 | Guichard | H04L 67/327 370/389 |
| 8,619,773 B2* | 12/2013 | Filsfils | H04L 45/30 370/389 |
| 8,819,561 B2* | 8/2014 | Gupta | H04L 41/0893 715/733 |
| 9,064,240 B2* | 6/2015 | March | G06Q 10/103 |
| 9,203,765 B2* | 12/2015 | Mestery | H04L 12/4633 |
| 9,424,079 B2* | 8/2016 | Rossbach | G06F 9/4843 |
| 9,461,996 B2* | 10/2016 | Hayton | G06F 21/31 |
| 9,479,409 B2* | 10/2016 | Zhang | H04L 43/50 |
| 9,672,261 B2* | 6/2017 | Holmes-Higgin | H04L 63/02 |
| 9,686,181 B2* | 6/2017 | Akiya | H04L 47/24 |
| 9,787,559 B1* | 10/2017 | Schroeder | H04L 43/08 |
| 9,794,379 B2* | 10/2017 | Kumar | H04L 45/306 |
| 9,838,242 B2* | 12/2017 | Tully | H04L 67/28 |
| 10,061,779 B2* | 8/2018 | Brand | H04L 45/124 |
| 10,326,824 B2* | 6/2019 | Surendran | H04L 67/1097 |
| 10,432,512 B2* | 10/2019 | Manghirmalani | H04L 47/31 |
| 2004/0056908 A1* | 3/2004 | Bjornson | G06F 8/34 717/115 |
| 2004/0085322 A1* | 5/2004 | Alcorn | G06T 15/005 345/562 |
| 2004/0186915 A1* | 9/2004 | Blaszczak | G06F 12/023 709/246 |
| 2005/0160398 A1* | 7/2005 | Bjornson | G06Q 10/06 717/104 |
| 2009/0158246 A1* | 6/2009 | Sifter | G06F 9/466 717/105 |
| 2010/0142377 A1* | 6/2010 | Caciula | H04L 43/50 370/241 |
| 2011/0276915 A1* | 11/2011 | Freire | G06Q 10/00 715/772 |
| 2013/0007088 A1* | 1/2013 | Alfredo | G06F 9/5066 709/201 |
| 2013/0096967 A1* | 4/2013 | Simitsis | G06Q 10/04 705/7.11 |
| 2015/0205819 A1* | 7/2015 | Brand | H04L 65/607 707/694 |
| 2015/0319207 A1* | 11/2015 | Werr | H04L 69/14 709/219 |
| 2016/0197834 A1* | 7/2016 | Luft | H04L 67/327 709/223 |
| 2016/0226944 A1* | 8/2016 | Hsiao | H04L 43/028 |
| 2016/0308766 A1* | 10/2016 | Register | H04L 43/028 |
| 2017/0048116 A1* | 2/2017 | Anderson | H04L 43/028 |

* cited by examiner

AUTOMATED DATA FLOWS USING FLOW-BASED DATA PROCESSOR BLOCKS

CROSS-REFERENCE

This application is a continuation of U.S. patent application Ser. No. 15/973,278, filed May 7, 2018 and entitled "AUTOMATED DATA FLOWS USING FLOW-BASED DATA PROCESSOR BLOCKS", which claims the benefit of U.S. patent application Ser. No. 15/249,104, filed Aug. 26, 2016 and entitled "SYSTEM AND METHOD FOR MINIMIZING DATA LOSS IN A NETWORK," which claims the benefit of U.S. Provisional Patent Application No. 62/211,401 filed Aug. 28, 2015 and entitled "SYSTEM AND METHOD FOR MINIMIZING DATA LOSS IN A NETWORK," both of which are hereby incorporated by reference.

TECHNICAL FIELD

The present disclosure generally relates to data transmission across networks, and specifically to a system and method for minimizing data loss across networks.

BACKGROUND

A given network may be inherently lossy (i.e., prone to lose data in some degree). That is, some amount of data transmitted over the lossy network can be expected to be lost. Another possible reason for losing data over the lossy network can be that network utilization exceeds the available capacity of the network and causes the network's underlying queues (temporary data storage locations) to be completely full, in which case packets of data will be dropped, because they cannot be placed into an empty slot or queue. The transmission rate utilized by network elements (i.e., servers, etc.) can contribute to exceeding network capacities.

BRIEF DESCRIPTION OF THE DRAWINGS

In order to describe the manner in which the above-recited and other advantages and features of the disclosure can be obtained, a more particular description of the principles briefly described above will be rendered by reference to specific examples thereof which are illustrated in the appended drawings. Understanding that these drawings depict only examples of the disclosure and are not therefore to be considered to be limiting of its scope, the principles herein are described and explained with additional specificity and detail through the use of the accompanying drawings in which.

DETAILED DESCRIPTION

Figure 1:
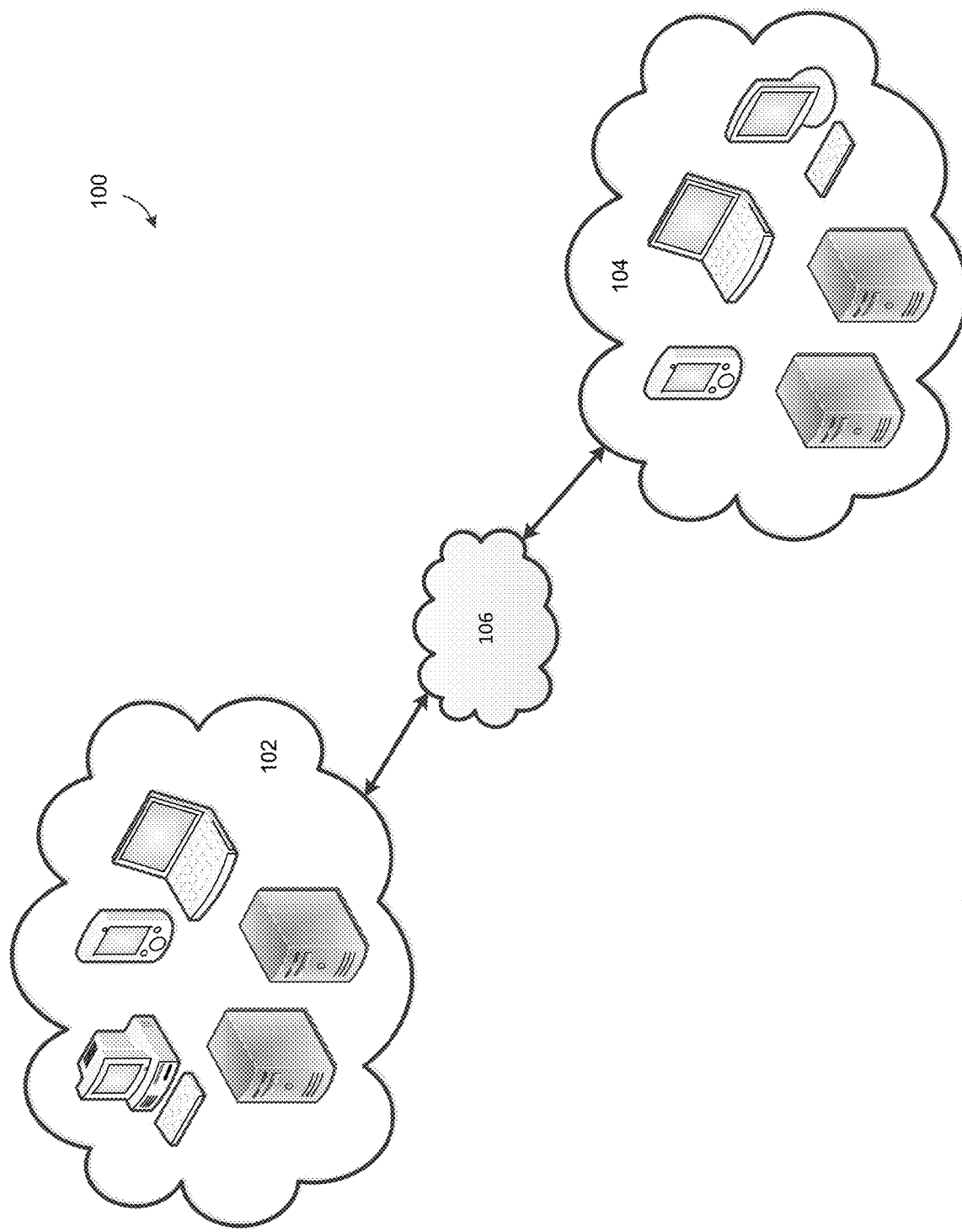
FIG. 1 is a block diagram illustrating an example data transmission network.

Reference will now be made in detail to examples, which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, components, circuits, and networks have not been described in detail so as not to unnecessarily obscure aspects of the examples.

The terminology used in the description of the disclosure herein is for the purpose of describing particular examples only and is not intended to be limiting of the disclosure. As used in the description of the disclosure and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected "may be construed to mean "upon determining" or "in response to determining" or "upon detecting [the stated condition or event]" or "in response to detecting [the stated condition or event]," depending on the context.

Features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

In a data transmission system, data may be transmitted at a fixed rate by sending individual packets of data (or datagrams) with a given inter-packet spacing (i.e., delay between beginning of sending each packet and the next packet). As noted above, a network may be inherently lossy due to the nature of the transmission medium or may experience congestion caused by other data transmitters consuming portions of network resources.

When network utilization exceeds the available capacity of the network and the network's underlying queues are filled to capacity, the networking equipment can drop packets that are unable to be placed in an empty queue slot, and data will be lost. One way to minimize data loss would be to reduce the rate at which data is transmitted (i.e., transmission rate). It is, however, important that data be transmitted quickly (especially when large quantities of data are to be transmitted). Methods and systems within this disclosure are directed to transmitting at the fastest rate possible without causing packets to be dropped because the capacity of queues is being exceeded. One way to enable the maximum transmission rate of data without data being so dropped is to discriminate between loss that is inherently caused by the network medium or other data transmitters and loss that is caused by excess data transmission.

One method of differentiating between the two types of data loss referenced above is as follows: Data packets are transmitted over a network at a predetermined rate (determined from preexisting data etc.). Over a set interval, the inter-packet spacing delay before and/or after a data packet is transmitted is increased. Such a packet can be termed a loss probe packet. Given that the time between the transmission of one or more loss probe packets is increased, (in other words they are sent with slightly less congestion pressure from a data transmitter), a loss probe packet has a higher statistical chance of reaching its destination than other packets sent at the earlier rate. After a statistically significant number of loss probe packets (and other normal data packets) have been transmitted, the statistical success rate of the normal data packets is compared to the success rate of the loss probe packets to determine if there is a meaningful difference (i.e., statistically) between the two. If less data is lost when sent at the lower transmission rate, it can be an indication that data packets are being dropped because data is being sent too quickly (i.e., queues are being completely filled). If there is a significantly elevated success rate in loss probe packets then the data transmitter can determine that it is causing loss in the network and adjust its normal inter-packet spacing delay to a higher value to avoid causing excessive retransmission. It will be understood that what constitutes a 'significantly' elevated success rate will be guided by the level of precision considered appropriate by a person skilled in the art in a given circumstance.

Due to the fact that networks are fast changing mediums, a pure sequential approach is not optimal and would be slow and not responsive enough. For example, a system with a unique control center in which a control software object determines the transmission rate unique for a certain period of time and then it decides if it is too low or too high. This approach results in a system which could go to the optimal speed in a simulated environment but would not responsive enough in a real network. To address this problem a system of simple transmitters (e.g., gamblers) is created at any given moment with different transmission rates. Each gambler is given a certain time of operation (e.g., a slot). Sending a packet on a network is similar to placing bet (i.e., the packet can arrive at the destination, a win, or be dropped for some reason, a loss). The system is able to assign the loss rate to each gambler with a optimized hash map which stores for each packet sent in a generation the ID of the sending gambler, so that when the system receives an ACK (acknowledge of the receiver) or a NACK (a loss report which lists the packets missing in the receiver) the system will communicate to each gambler the results of its bets.

When all the gamblers have consumed their associated slot the system ends a generation and the gamblers which have the "greatest score" will be able to "reproduce", and the one with the lowest score will be removed or terminated. The score is computed with a formula which includes the inherent loss of the loss probe packet. A gambler with a high loss could be "better" than a gambler with a low loss if the loss probe is high, that could indicate a lossy network, so that the loss of the gambler is not imputable to its fast transmission but on the characteristics of the network. If, instead, the loss of the probe packets is low a gambler with a high loss rate will have a low score and be terminated.

It is also possible to derive the underlying network's inherent loss rate by measuring the loss rate of the loss probe packets. Once a transmission rate that reduces the packet loss rate is identified, the transmission rate can be increased incrementally until an increase in data loss is observed. Once the increase (i.e., in transmission rate) is observed, it is an indication that the loss rate corresponding to the rate of the transmission immediately before observation of increase in loss rate is the inherent loss rate of the transmission network.

Since the derived inherent network loss rate is the lowest loss rate that can be achieved using the network, the network loss rate can be used as a target loss rate when adjusting the aggressiveness of data transmission. That is, probe packets can be sent to evaluate the loss rate in a given period, and if the loss rate for the probe packets does not exceed the inherent loss rate, it can indicate that data is not being lost due to congestion. Accordingly, transmission throughput is maximized without causing congestion in the network.

FIG. 1 is a block diagram illustrating an example data transmission system 100. Servers (e.g., 102, 104) can be any devices of varying type, capabilities, operating systems configured to transmit and receive data over network (e.g., 106). For example, servers, computing devices, tablets, notebooks, laptops, storage arrays, etc. and as further illustrated in FIGS. 6A and 6B. The network (e.g., 106) can be a wide area network, local area network, virtual private cloud, virtual private network, storage area network, or any data transmission network enabled to receive and transmit data between two or more servers. Data packets can be sent from server 102 through a network 106 to server 104 (or vice versa). In some examples data transmission system 100 can include a source server (e.g., 102) can be in signal communication with a device running a web browser and a target server (e.g., 104). The web browser can be used to implement command and instructions to, and receive information from the source server. The source server can include or be coupled to an Apache Web Server. The Apache Web Server can be coupled to a storage unit storing one or more configuration files. The source server can also be at least one storage unit storing keys, which can be public keys or private keys or both. The Apache Web Server can control replication between a source server or target server (e.g., 104). In some examples, replication can be bi-directional (e.g., source to target, target to source).

Figure 2:
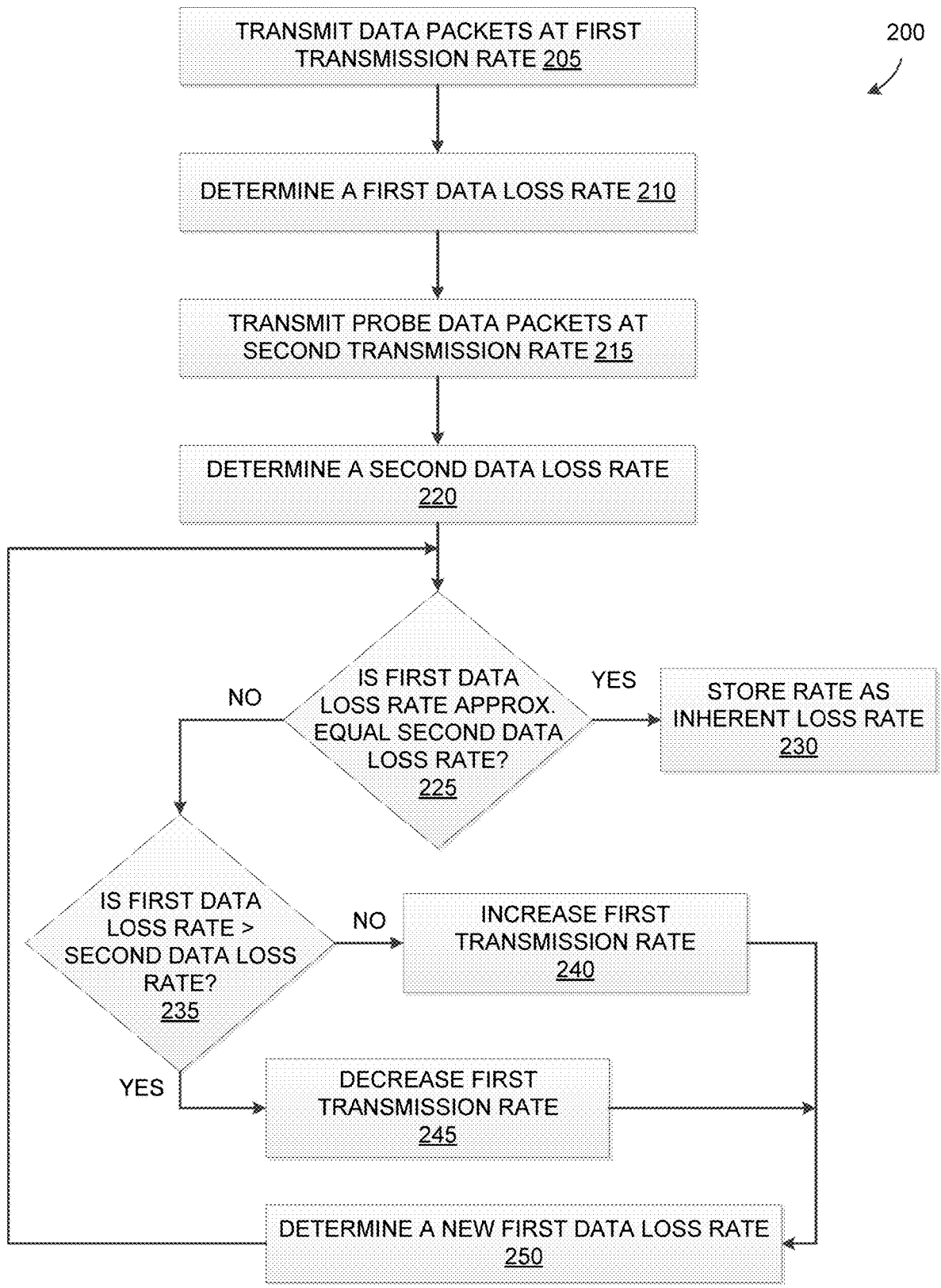
FIG. 2 is a flow diagram illustrating an example method for determining an optimal transmission rate.

FIG. 2 illustrates a flow diagram of an example method for differentiating between data loss caused by properties inherent to the system 100 and/or the network 106 and data loss caused by congestion by the servers (e.g., 102, 104). The method of FIG. 2 is provided by way of example, as there are a variety of ways to carry out the method. Additionally, while the example of method 200 is illustrated with a particular order of blocks, those of ordinary skill in the art will appreciate the method of FIG. 2 and the blocks illustrated therein can be executed in any order that accomplishes the technical advantages of the present disclosure and can include fewer or more blocks than illustrated.

Each block shown in FIG. 2 can represent one or more processes, methods, or subroutines, carried out in example method 200. The blocks illustrated in FIG. 2 can be implemented in the system 100 illustrated in FIG. 1. Each block in FIG. 2 can be carried out by a proxy server, clients, local services, remote servers, or one or more servers (e.g., 102, 104) or systems 100 as illustrated in FIG. 1. Additionally, those of ordinary skill in the art will appreciate that the blocks illustrated in FIG. 2 can included instructions of processes stored in a non-transitory computer readable medium communicatively coupled to a server (e.g., 102, 104), clients, local services, remote servers, or one or more remote servers (not shown).

At block 205, data packets are transmitted over a network at a first transmission rate. For example, a first predetermined transmission rate. In some examples, the first transmission rate can be set by an administrator. In other examples, the first transmission rate can be chosen at random (e.g., 100 µs, which corresponds to approximately 100 Mbps—when the packet size is approximately 1.4 Kb). For example, 100 µs can be converted to Mbps based on an assumption that every packet is approximately 1400 bytes in size (the maximum normal size of a TCP packet is 1500 bytes, approximately 40 bytes of headers). Accordingly, when the packets are separated by 100 µs, 10,000 packets are transmitted per second, which is approximately 14 Mbs, which are 100 Mbit. In other examples, the first transmission rate can be chosen based on previous estimates or transmission rates used at similar specifications (e.g., time, size, length, etc.).

At block 210, a first data loss rate can be determined. For example, the first data loss rate can be determined based on a number of packets lost during a first transmission rate. In some examples, the first data loss rate can correspond to the first transmission rate of 205.

At block 215, a probe data packet can be sent at a second transmission rate. For example, a statistically significant number of loss probe data packets are transmitted over the network (e.g., 106) at a second transmission rate. The second transmission rate can be different than the first transmission rate. In some examples, the second transmission rate can be predetermined. In some examples, the second transmission rate can be less than the first transmission rate. In other examples, the second transmission rate can be greater than the second transmission rate.

At block 220, a second data loss rate can be determined. In some examples, the second data loss rate can correspond to the second transmission rate of 215. In some examples, the second data loss rate can be determined based on a number of packets lost during the second transmission rate.

At block 225, the second data loss rate is compared with the first data loss rate. For example, a determination is made as to whether the first data loss rate is approximately equal to the second transmission rate. In the event the first data rate is approximately equal the second data rate the method can proceed to block 230. At block 230, the first data rate (or second data rate) is stored as the inherent loss rate of the network (e.g., 106). In event the first data loss rate is lower or higher than second data loss rate, the method can proceed to block 235.

At block 235, a determination is made as to whether the first data loss rate is greater than the second data loss rate. When the first data loss rate is not greater than (i.e., less than) the second data loss rate, the method can proceed to block 240. When the first data loss rate is greater than the second data loss rate, the method can proceed to block 245. In other examples, a determination can be made as to whether the first data loss is less than the second data loss rate (or any combination thereof where the method can proceed to the correct block based on the values of the first data lost rate and second data loss rate).

At block 240, the first transmission rate can be increased. For example, the first transmission rate can be increased by (or to) predetermined amount. In some examples, the predetermined amount can be set by an administrator. In other examples, the predetermined amount can be determined based on the difference between the first data transmission rate and the second data transmission rate. In other examples, the predetermined amount can be an incremental amount based on the first transmission rate (or the inherent network loss rate).

At block 245, the first transmission rate can be decreased. For example, the first transmission rate can be decreased predetermined amount. In some examples, the predetermined amount can be set by an administrator. In other examples, the predetermined amount can be determined based on the difference between the first data transmission rate and the second data transmission rate. In other examples, the predetermined amount can be an incremental amount based on the first transmission rate (or the inherent network loss rate).

At block 250, a new first data loss rate can be determined. For example, the new first data loss rate can be determined based on a number of packets lost during the increased (or decreased) first transmission rate. In some examples, the new first data loss rate can correspond to the new first transmission rate of 240 or 245. When the new first data loss rate is determined, the method can return to block 225.

The method 200 can be repeated until the first data loss rate (or new first data loss rate) is approximately equal to the second data loss rate. As such, the first transmission rate is incrementally increased or decreased until approximately equal the second data loss rate.

Figure 3:
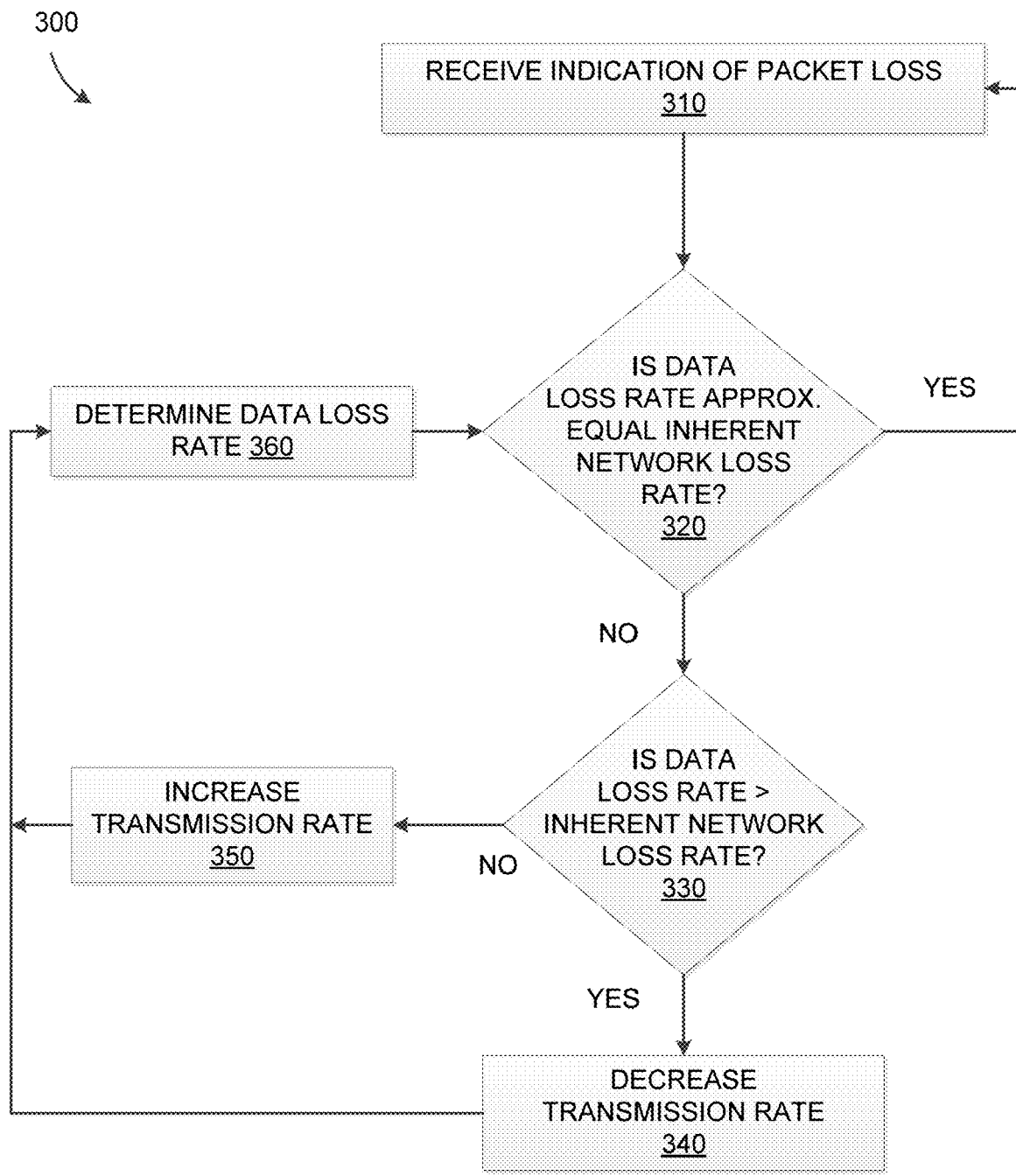
FIG. 3 is a flow diagram illustrating another example method for determining an optimal transmission rate.

FIG. 3 illustrates a flow diagram of a method for differentiating between data loss caused by properties inherent to the system 100 and/or the network 106 and data loss caused by congestion by the server (e.g., 102, 104). The method of FIG. 3 is provided by way of example, as there are a variety of ways to carry out the method. Additionally, while the example of method 300 is illustrated with a particular order of blocks, those of ordinary skill in the art will appreciate the method of FIG. 3 and the blocks illustrated therein can be executed in any order that accomplishes the technical advantages of the present disclosure and can include fewer or more blocks than illustrated.

Each block shown in FIG. 3 can represent one or more processes, methods, or subroutines, carried out in example method 300. The blocks illustrated in FIG. 3 can be implemented in the system 100 illustrated in FIG. 1. Each block in FIG. 3 can be carried out by a proxy server, clients, local services, remote servers, or one or more servers (e.g., 102, 104) or systems 100 as illustrated in FIG. 1. Additionally, those of ordinary skill in the art will appreciate that the blocks illustrated in FIG. 3 can included instructions of processes stored in a non-transitory computer readable medium communicatively coupled to a server (e.g., 102, 104), clients, local services, remote servers, or one or more remote servers (not shown).

Method 300 can begin at block 310. At block 310, a server can receive an indication of packet loss. For example, a server (e.g., 102, 104) can receive an indication that a number of packets sent during a time period were unsuccessfully transmitted. In some examples, the server can received an indication that the loss of packets during a predetermined time period is greater than a threshold amount. In other examples, the server can receive an indication that loss of packets during a predetermined time period is less than a threshold amount.

At block 320, a data loss rate (of the packets) is compared with the inherent network loss rate. For example, a determination of whether the data loss rate is approximately equal to the inherent network loss rate. The inherent network loss rate can be the expected amount of the packet loss operating at an optimal transmission rate (i.e., the transmission rate is not a relevant factor in the packet loss). In the event the data loss rate is approximately equal the inherent network loss rate the method can proceed back to block 310 (at a predetermined interval). For example, to determine the transmission rate of packets is optimal over a period of time. In the event the data loss rate is not approximately equal the inherent network loss rate the method can proceed to block 330.

At block 330, a determination made as to whether the data loss rate is greater than the inherent network loss rate. When the data loss rate is greater than the inherent network loss rate, the method can proceed to block 340. When the data loss rate is not greater than (i.e., less than) the inherent network loss rate, the method can proceed to block 350. In other examples, a determination can be made as to whether the first data loss is less than the second data loss rate (or any combination thereof where the method can proceed to the correct block based on the values of the data lost rate).

At block 340, the transmission rate can be decreased. For example, the transmission rate can be decreased by (or to) a predetermined amount. In some examples, the predetermined amount can be set by an administrator. In some examples, the predetermined amount can be determined based on the different between the data transmission rate and the inherent network loss rate. In other examples, the predetermined amount can be an incremental amount based on the transmission rate.

At block 350, the transmission rate can be increased. For example, the transmission rate can be increased by (or to) a predetermined amount. In some embodiments, the predetermined amount can be set by an administrator. In some examples, the predetermined amount can be determined based on the different between the data transmission rate and the inherent network loss rate. In other examples, the predetermined amount can be an incremental amount based on the transmission rate.

At block 360, a data loss rate can be determined. For example, the data loss rate can be determined based on a number of packets lost during the increased (or decreased) transmission rate (from blocks 340 or 350). In some examples, the data loss rate can correspond to the new transmission rate (from blocks 340 or 350). When the data loss rate is determined, the method can proceed back to block 320.

The method 300 can be repeated until the data loss rate is approximately equal to the inherent network loss rate. As such, the transmission rate is incrementally increased or decreased until approximately equal the inherent network loss rate.

Figure 4:
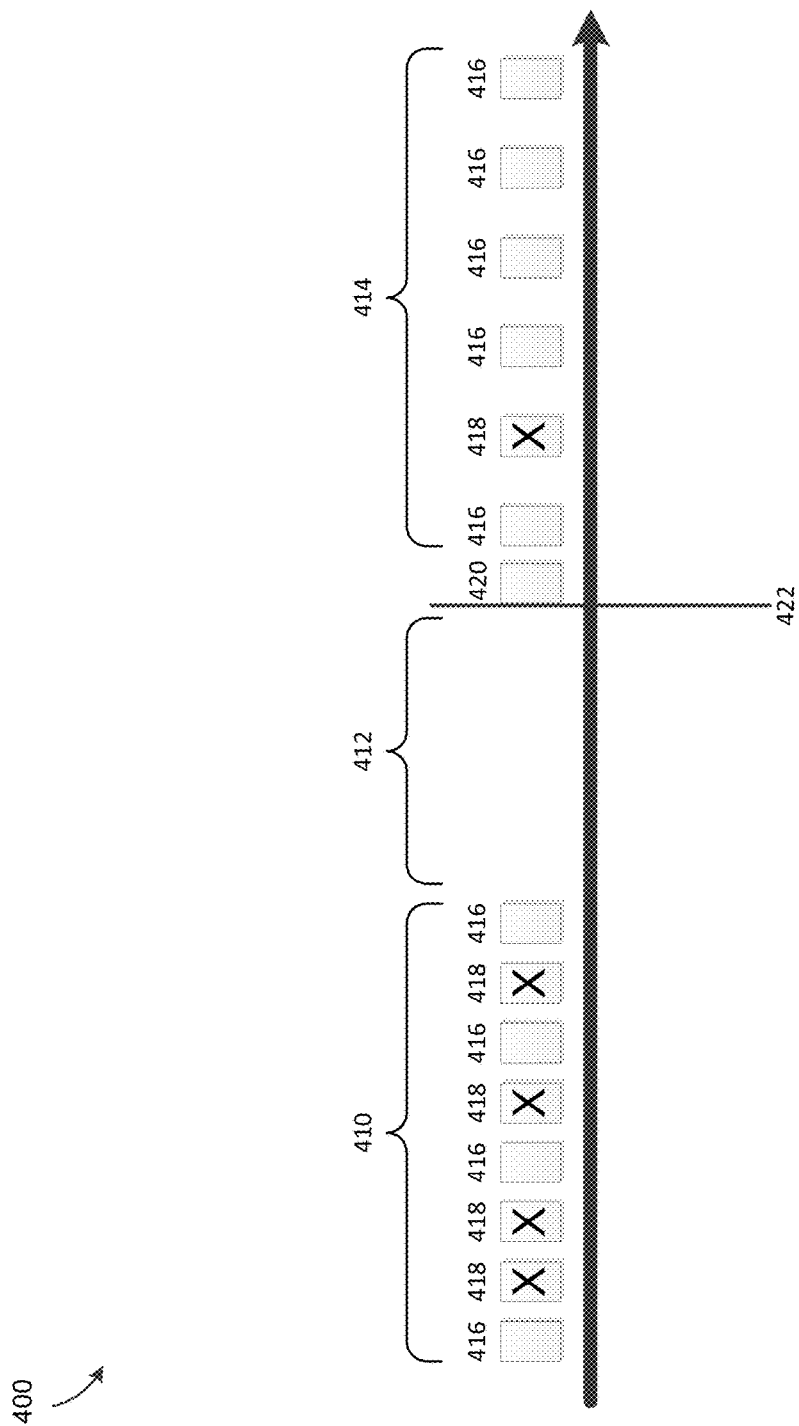
FIG. 4 is a block diagram illustrating example gambler strategies.

FIG. 4 is a block diagram illustrating an example gambler strategy 400 to determine an optimal transmission rate over a network. Gambler strategy 400 illustrates two gamblers (e.g., 410, 414) of a plurality of gamblers. Each gambler (e.g., 410, 414) can transmit packets at different rates. The rates can be randomly selected or can be based on heuristic techniques. In some examples, the rates for gamblers can be determined before the gamblers have started transmission. In other examples, the rates of the gamblers can be determined on-demand or after the first gambler has begun transmission.

Based on the determined rate, each gambler (e.g., 410, 414) can transmit a plurality of packets (416, 418). Packets 416 can represent packets that were successfully transmitted, and packets 418 can represent packets that were not successfully transmitted (e.g., lost, not yet received, etc.). Gambler 410 illustrates a strategy of fast transmission of packets (e.g., small wait time between transmission). As such, gambler 410 will transmit more packets during a predetermined time than gamblers with slower transmission times (e.g., 414). As shown in FIG. 4, gambler 410 pays a higher price (e.g., more packet loss) than gambler 414 for the faster transmission rate. The different patterns of gain-loss (e.g., packet loss verse transmission rate) can be apparent from loss reports generated by the receiver (i.e., of the packets).

FIG. 4 also demonstrates a wait time 412 between gamblers. The wait time enables the network to discharge possible congestion (i.e., created by previous gambler) so the next gambler to operate can be run under similar conditions to the previous gamblers. The wait time 412 also enables probe packet 420 sent at time 422 (e.g., end of wait time) to estimate the "loss zero" (i.e., the intrinsic loss of the network). This assumption can be made because the network is assumed to be returned to the "resting" behavior at time 422.

An example gambler strategy 400 can also determine merits of each gambler based on the generated lost reports and/or loss zero. In some examples, the merits can be determined when all the gamblers have completed. In other examples, the merits can be determined after completion of one or more gamblers of the strategy (e.g., after each gambler, after a specific number of gamblers, after a predetermined number of gamblers, etc.). In response to determining the merits, the subsequent gambler strategies can take into consideration the determined merits in selecting gamblers for execution.

In determining the merits of a gambler, a server can determine a win rate. The win rate can be a ratio between the packets which have been successfully transmitted (i.e., received at the destination) and the total packets sent by the gambler. As such, this ratio can inherently not be greater than 1. The win rate can then be adjusted using the loss zero of the network. In some examples, the adjusted win rate can be calculated by taking the minimum of "1.0" or the win rate added to the loss zero of the network. The merit can then be calculated using the adjusted win rate and the total trades performed by the gambler(s). A trade can be pairing the act of transmitting a packet and the result of the transmission (e.g., either a "win"—the packet is arrived at destination or a "loss"—the packet did not arrive at the destination). In some examples, the merit of a gambler can then be calculated using the Equation (1).

$$\text{merit} = \text{pow (adjusted win rate, 10)} \cdot \text{pow (total trades, 0.33)} \qquad \text{Equation (1)}$$

In this example, the adjusted rate is penalized by a power of 10 (e.g., penalizing quick win rates that are less than 1.0). The cubic root of the total trades can provide a slight advantage to more risk tolerate gamblers. In other examples, these values (e.g., 10, 0.33) can be altered as required (or specified) by a network (e.g., specific performance criteria, methodologies, guidelines, etc.).

Example gambler strategy 400 can also automatically adjust for the loss report cycle. Determining the merit of a gambler is based on the loss report. The determination of the merit can be influenced based on the intervals in which the loss reports are received at the server. For example, a loss report that is received after the merit has been calculated would not be considered during the determination (of the merit) and a loss report that is received before the gambler has finished transmitting packets can count packets which are still in transit as lost (e.g., rendering the loss report unreliable). Gambler strategy 400 (e.g., via the server sending the loss reports and receiving the packets from the gamblers) can mitigate the effects of the intervals in which loss reports are received by tracking wasted packets (e.g., a packet that has been transmitted and counted as lost—for which at least a loss report has been sent—and that packet is received twice or more).

In some examples, the destination of the packets transmitted from the server running the gamblers can track the wasted packets. The destination can track a packet as wasted because, the destination tracks the sent loss reports and the gaps that are created by the lost packets. The destination can automatically adjust the rhythm (e.g., the interval at which the loss reports are sent from the destination to the server) of the loss reports by minimizing the number of wasted packets. The automatic adjustments made to the loss reports can then be transmitted to server running the gamblers for consideration in determining the merit. In some examples, the destination can also automatically adjust the number of packets required for each generated loss report. For example, the destination can attempt to fill the channel (e.g., transmitting a loss report at multiples of the round-trip delay time, each loss report containing the request to resend packets) using Equation (2).

$$\text{Bandwidth-delay product} = \text{Bandwidth} * \text{delay} \quad \text{Equation (2)}$$

Figure 5:
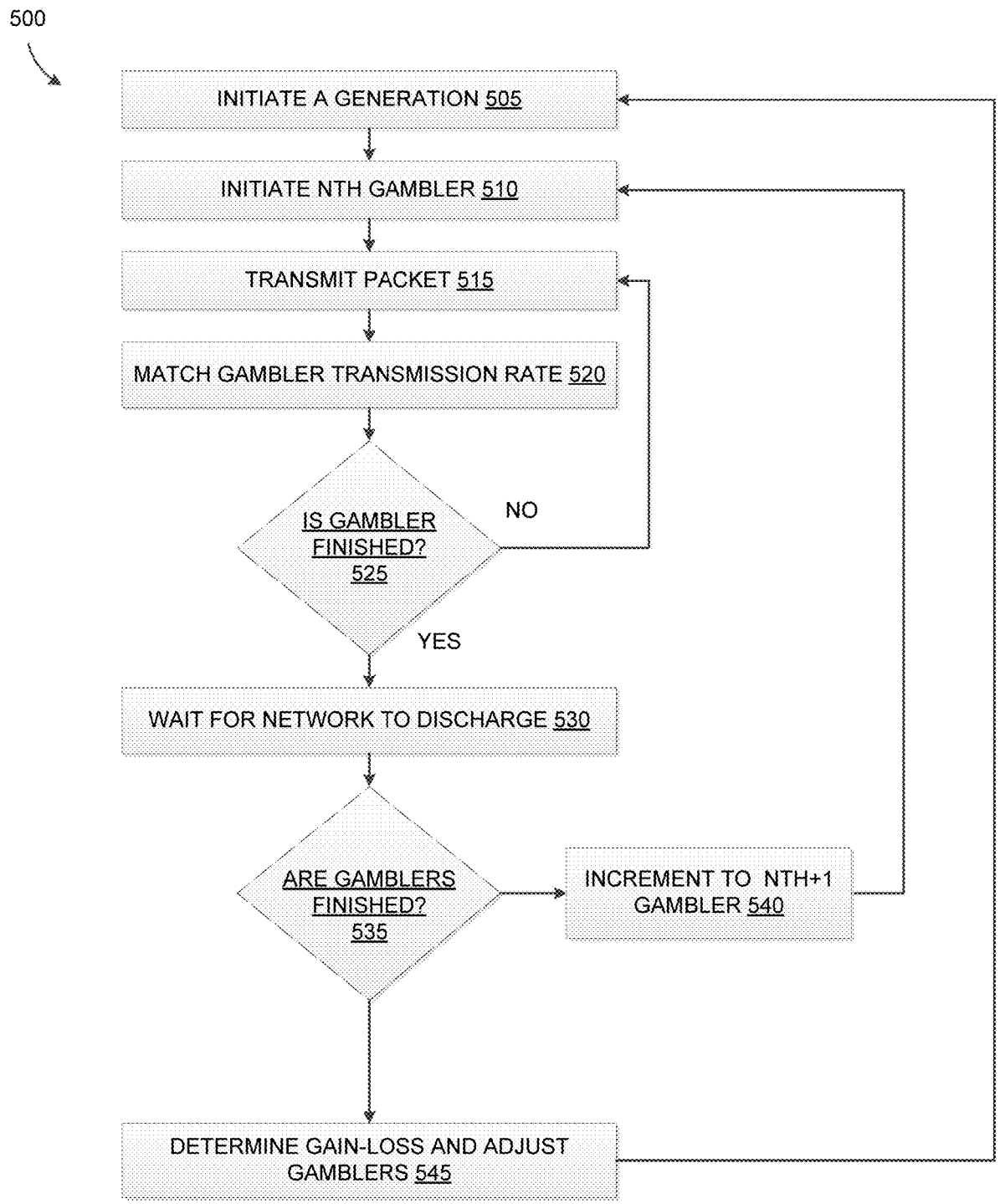
FIG. 5 is a flow diagram illustrating an example method for determining an optimal transmission rate using gambler strategies.

FIG. 5 illustrates a flow diagram of a method for determining an optimal transmission rate over a network. The method of FIG. 5 is provided by way of example, as there are a variety of ways to carry out the method. Additionally, while the example of method 500 is illustrated with a particular order of blocks, those of ordinary skill in the art will appreciate the method of FIG. 5 and the blocks illustrated therein can be executed in any order that accomplishes the technical advantages of the present disclosure and can include fewer or more blocks than illustrated.

Each block shown in FIG. 5 can represent one or more processes, methods, or subroutines, carried out in example method 500. The blocks illustrated in FIG. 5 can be implemented in the system 100 illustrated in FIG. 1 and gamblers illustrated in FIG. 4. Each block in FIG. 5 can be carried out by a proxy server, clients, local services, remote servers, or one or more servers (e.g., 102, 104) or systems 100 as illustrated in FIG. 1. Additionally, those of ordinary skill in the art will appreciate that the blocks illustrated in FIG. 5 can included instructions of processes stored in a non-transitory computer readable medium communicatively coupled to a server (e.g., 102, 104), clients, local services, remote servers, or one or more remote servers (not shown).

Method 500 can begin at block 505. At block 505, a generation (e.g., gambler strategy) can be initiated on a server (e.g., 102, 104). For example, a generation can be initiated at a specific or predetermined time. The generation can have a specific or predetermined number of gamblers.

At block 510, an nth gambler can be initiated. The nth gambler can be the first gambler of the plurality of gamblers of the generation to be initiated. At block 515, the nth gambler (i.e., running on the server) can transmit a packet(s). At block 520, the server can match the nth gambler transmission rate for the transmission of the packet (i.e., at block 515). After, the nth gambler (i.e., running on the server) has transmitted the packet at the nth gambler transmission rate, the method can determine at block 525, whether the gambler has finished (i.e., transmitting packets). When the gambler has not finished transmitting packets, method 500 can return to block 515 (i.e., to transmit another packet). When the gambler has finished transmitting packets, method 500 can proceed to block 530.

At block 530, the server can wait for the network to discharged (e.g., 412). The server can also send a probe packet (e.g., 420) at the end of the wait period (e.g., 422) to determine the inherent loss of the network. When the wait period has expired a probe packet can be transmitted to determine the data loss inherent in the network.

At block 535, a determination is made as to whether the plurality of gamblers are finished. If the plurality of gamblers are not finished (i.e., there are one or more gamblers to initiate) method 500 can proceed to block 540. If the plurality of gamblers are finished, method 500 can proceed to block 545.

At block 540, the nth gambler can be incremented to the nth+1 gambler and the method can proceed to block 510 where the nth+1 gambler can be initiated. The nth+1 gambler can be the next gambler (following the nth gambler) of the plurality of gamblers to be initiated. This process can continue until the gamblers in the plurality of gamblers of the generation have been initiated and completed.

At block 545, the gain-loss can be determined and the gamblers can be adjusted for the next generation. For example, the server can receive a lost report for the gamblers. The lost report can provide information on packets transmitted, success of the transmission, etc. The server can determined, based on the lost report the gain-loss of the gamblers (transmission rates v. packet loss). Based on the gain-loss, the gamblers can be adjusted for the next generation. For example, adjustments can be removing the gamblers which have a significant lower success rate and creating new gamblers with a transmission rate which are closer to the inherent network lost rate. If during the current generation (e.g., block 505) the server has not received a threshold number of loss reports, no adjustments are made the gamblers. After the adjustments have been made to the gamblers, method 500 can proceed to block 505 for the next generation.

In some embodiments, the aforementioned systems and methods for data and transport acceleration can be employed in the context of one or more environments where it is often necessary or otherwise desirable to transmit data in an accelerated fashion (e.g., transmitting data in large quantities, at a high frequency, or both). Environments and sources of data that may be employed in the context of the present disclosure can include cloud environments, cloud NAS, conventional file systems, file servers, network attached storage, data centers, connected devices, Internet-of-Things (IoT) devices, edge locations, etc. In each of these scenarios, data is either stored or generated at a first location and needs to be transported, migrated, duplicated, etc. to one or more second locations, which may or may not be remote from the first location. For example, a data source might comprise an on-premises datacenter that needs to be migrated to a public cloud environment. In this case, acceleration could be desirable due to the massive quantities of data that are commonly found in many datacenters. In another example, a data source might comprise an edge location with one or more IoT devices, such as a manufacturing facility generating telemetry and other production-related data. In this example, the data needs to be ingested into a central cloud location for monitoring, presentation, and analysis, and accelerations could be desirable in order to reduce latency and maintain a substantially real-time record of data from the edge location(s). In a still further example, data might need to be migrated from a private cloud environment to one or more public cloud environments, or data might need to be duplicated from a public cloud environment to a private cloud environment. In such scenarios, a cloud environment can act as a source node for the data transmission, a destination node for the data transmission, an intermediate node for the data transmission, or in some combination of the above. Cloud environments can include public clouds, private clouds, hybrid clouds, etc., making use of various storage technologies and hardware as is desired. For example, a source or destination node for the data transmission might be a cloud NAS (Network-Attached Storage) environment, such as the SoftNAS Cloud® offered by SoftNAS, Inc., of Houston, Tex., although it is appreciated that other cloud environments can be employed without departing from the scope of the present disclosure.

Figure 6:
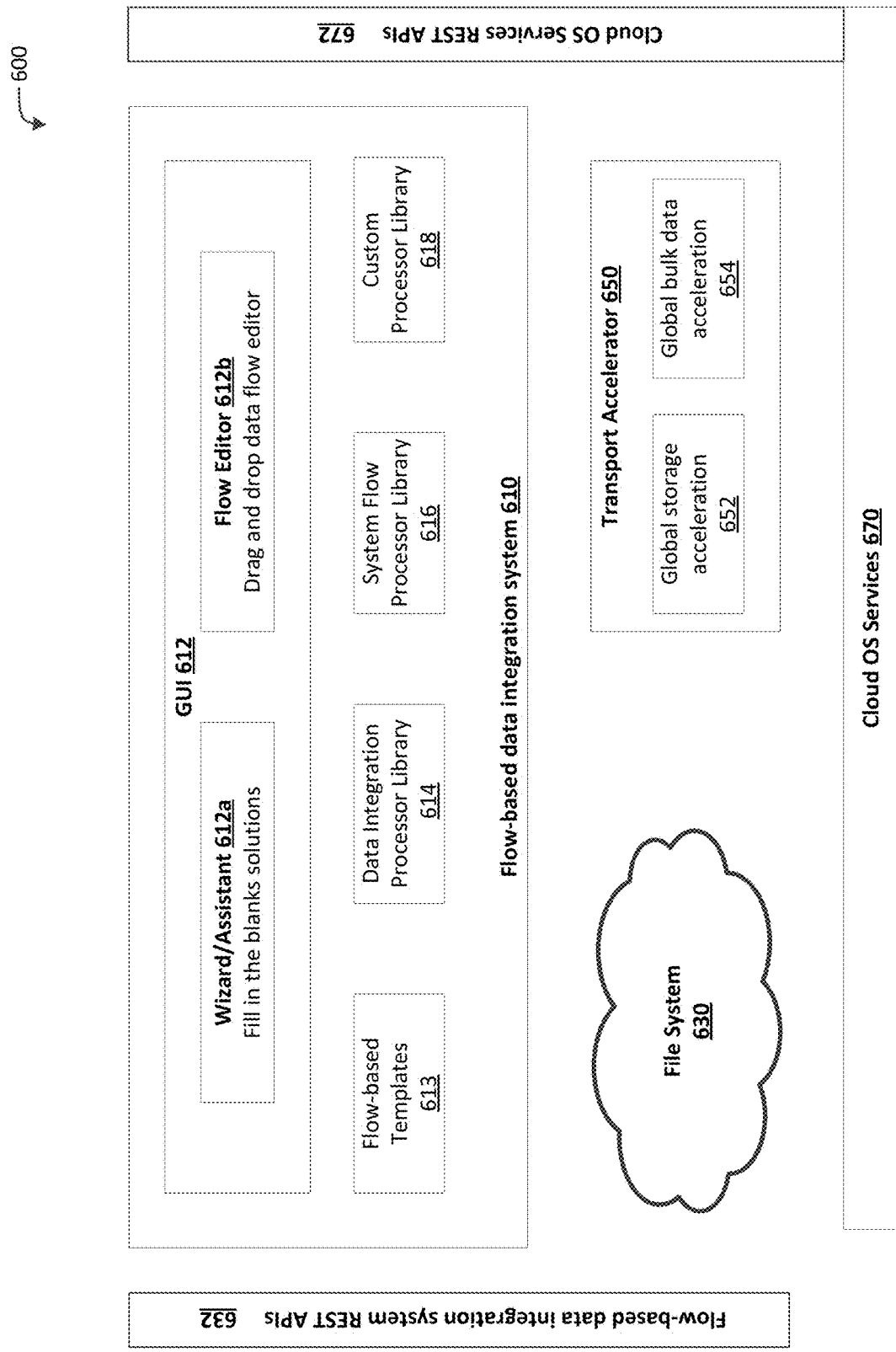
FIG. 6 is an exemplary system architecture for a flow-based data integration system of the present disclosure.

FIG. 6 depicts an exemplary system architecture 600 which includes, at a high level, flow-based data integration system 610, file system 630, a data transport accelerator 650 (optional), and cloud OS services 670. Although shown as separate components in architecture 600, it is appreciated that one or more of these depicted components (and sub-components) can be combined without departing from the scope of the present disclosure. In some embodiments, one or more components of architecture 600 can be implemented or otherwise provided on a single computing node, either physical or virtual. In some embodiments, even when one or more components of architecture 600 are provided on different nodes, these different nodes may remain in relatively close proximity to one another, for example located in the same premises, data center, geographic region, etc. In some embodiments, different nodes might be provided remote from one another, with the different nodes communicatively coupled by a Wide Area Network (WAN), Internet, Intranet, or various other communication networks.

The file system 630 provides storage capacity and associated functionalities to the flow-based data integration system 610. File system 630 can be local, can be network-attached, or can be some combination of the two. In some embodiments, file system 630 might comprise network attached storage such as a NAS, or might comprise a physical or rack-based file system and/or file server. In some embodiments, file system 630 can comprise a cloud NAS or other cloud storage system, which, rather than relying upon discrete, on-premises hardware, instead relies upon virtualized environments provided by one or more public and/or private clouds in order to implement its associated NAS functionalities. In some embodiments, file system 630 can connect to these public and private clouds via cloud OS services 670 and/or the associated cloud OS services REST APIs 672. File system 630 can implement tiered storage, object and block storage, high availability, etc., using various file system protocols and storage standards, including but not limited to NFS, CIFS, AFP and iSCSI.

The transport accelerator 650 includes a global storage acceleration system 652 and a global bulk data acceleration system 654. In some embodiments, when utilized, the transport accelerator 650 can implement one or more of the systems and methods described previously with respect to FIGS. 1-5, although other data and storage acceleration methods are contemplated. In some embodiments, the transport accelerator 650 can be provided as a software-defined logic or as one or more instructions in a non-transitory medium configured to cause one or more processor to perform data acceleration. In some embodiments, the transport accelerator 650 can be configured in the form of one or more hardware circuits or analog circuits for performing data acceleration without requiring oversight or explicit control and direction from one or more processors. In some instances, the transport accelerator 650 can be interposed as an intermediate in order to provide storage and data acceleration. In other instances, an transport accelerator 650 might be provided on both the transmit and receive ends of a communication in order for the acceleration to be provided. For example, one or more of global storage acceleration system 652 and global bulk data acceleration 654 could be implemented into a transceiver used for one or more of the communications described herein with respect to FIGS. 6-10.

Flow-based data integration system 610 can be used to automate the migration, replication, transformation, and ultimately, the integration of data between sources and destinations that may have disparate or otherwise incompatible characteristics. Such processes can be referred to as 'automated data migration flows'. In order to do provide such functionality and execute these automated data migration flows, data integration-system 610 relies upon a flow-based processing structure that is built around a series of processor blocks, wherein a given processor block can be broadly understood to be either a data connector (implements I/O operations, data retrieval or ingestion operations) or to be a data transform (implements any kind of additional processing on ingested data), although other classifications are possible. Data integration system 610 can store these data processors in three libraries: data integration processor library 614, system flow processor library 616, and custom processor library 618. It is noted that these libraries are depicted as distinct components for the sake of clarity, and may in fact be implemented as a single library or data store within data integration system 610.

The system flow processor library 616 comprises processor blocks that implement basic functionalities of the data integration system 610, e.g. reading an RSS feed or reading a file out of a directory (both considered data connectors), and encrypting data or compressing data (both considered data transforms). In some embodiments, the system flow processor library can comprise one or more Apache NiFi FlowFile processors.

The data integration processor library 614 comprises processor blocks that implement functionalities (either as data connectors or data transforms) specifically directed to the migration of data from physical locations, legacy hardware, etc. For example, a first set of data integration processors can be provided to enable the seamless bulk transfer of business data to the cloud, while a second set of data integration processors can be provided to enable the transfer of live production data. As will be seen in subsequent examples, transfer destinations can include the file system 630.

In operation, one or more data connector processor blocks are utilized to ingest or retrieve data from the specified data source or location (and later to write data to specified location). Different types of data connector processor blocks can be employed in order to ingest different types of data or to ingest data from different types of sources. For example, as mentioned previously, an HTTP block could be utilized to retrieve web content from a specified address, while a File Get block could be utilized to retrieve a file from a specified directory (or to retrieve any changes to the file content of a specified directory). In such ingestion operations, data connector processor blocks can utilize the data integration system REST APIs 632 and/or the cloud OS services REST APIs 672. In output operations, data connector processor blocks can use the cloud OS services REST APIs 672 to write data to an external cloud environment, or can use the data integration system REST APIs 632 to write data to file system 630. Returning to the discussion of ingestion, upon ingestion, the data flows are normalized into data objects. In some embodiments, in the context of the above example the data object for ingested HTTP data can be of an identical or substantially similar format to the data object for ingested file directory data. For each data object, after or during normalization, the data integration system 610 can attach one or more attributes relating to the content of the data object (e.g. source URL, source file directory, file name, etc.). In some embodiments, data integration system 610 can also implement provenance tracking to automatically record and index provenance data for each data object that flows through the system and its associated data processor blocks, in which case the provenance data can also be stored as an attribute. In some embodiments, provenance data might be stored independent of the attributes associated with a given data object.

One or more data transform processor blocks are then utilized to operate upon or perform any subsequently desired processing upon the data objects that are output by the data connector processor blocks. Advantageously, data integration system 610 can permit the output of a data connector processor block to be automatically linked to the input of one or more data transform processor blocks, and furthermore can implement prioritized queuing in order to ensure the smooth handling of data objects as they flow from upstream processor blocks to downstream processor blocks. Notably, any number of processor blocks can be applied to a given data object, and because the output of any given processor block can be sent to multiple destinations (downstream processor blocks), various different operations can be performed in parallel on the same input data object by these different downstream processor blocks.

In order to configure these arrangements of processor blocks, and to configure certain aspects of the individual processor blocks themselves, data integration system 610 provides a GUI 612, which is divided into two components: first, a wizard 612a which automates user input and configuration of one or more flow-based templates 613; and second, a flow editor 612b which permits drag-and-drop or other user-defined manual construction of workflows. The same workflows and operations can be achieved via either wizard 612a or flow editor 612b. These workflows and operations include, but are not limited to: NFS and CIFS/SMB file sharing, SaaS-enabled Apps, Lift and Shift cloud data and application migration, global bulk data transfer, branch office integration, cloud backup repository, cloud archive, bulk data transfer, flexible data replication, IoT integration, etc.

If selected, wizard 612a might prompt a user to select one or more templates from the store of flow-based templates 613. In some embodiments, these templates 613 might be pre-defined or otherwise associated with data integration system 610 and wizard 612a. In some embodiments, a user can use wizard 612a to edit and update an existing one of the templates 613, or can create a new template and save it with the templates 613. The templates encode a series of processor blocks into desired upstream and downstream relationships in order to effect an operation that is associated with the template. Various examples of such operations, which can be stored as one or more templates 613, will be discussed with respect to FIGS. 8-10. In many cases, wizard 612a will prompt a user to provide certain pieces of input data that are required in order to fully configure the template 613 for execution or implementation. For example, such user inputs might include the data source(s) (URL, file directory, network location, etc.), any credentials required to access the data source (username, password, etc.), data migration parameters (create a backup from live production data and migrate the backup copy, migrate live production data directly), the data destination(s), etc. In other words, the templates 613 encode the data ingestion and data transformations that are relatively invariable or otherwise independent from the specific nature of the data source and destination, whereas the required user inputs to wizard 612a are those factors which are variable or otherwise dependent upon the specific nature of the data source and destination.

If flow editor 612b is selected, a user can be presented with a blank working space and visual representations of one or more available processor blocks drawn from data integration processor library 614, system flow processor library 616, and custom processor library 618. A user can click or otherwise provide user input using various known user input devices in order to select a desired processor block, and then drag or other gesture to place the selected processor block onto the working space. In this manner, desired workflows can be constructed manually, or in such a way that they are driven wholly or in majority by user preference. The same upstream and downstream relationships and connections that have been described above are in this case also specified by user input into flow editor 612b, such that the user is able to configure or adjust all aspects of their desired workflow. In some instances, individual processor blocks may require further user configuration once placed into the working space, a requirement which can be visually indicated in the flow editor 612b, for example by causing such processor blocks to be displayed in a different color. For example, data connector processor blocks can require configuration with a data source or a pointer to the data source, and data transform processor blocks can require configuration with one or more parameters controlling the corresponding data transformation. In some embodiments, flow editor 612b can include an option for a user to save a newly constructed workflow into the data store of flow-based templates 613. Upon satisfactory completion of the user-defined workflow, flow editor 612b can include an option for the user to trigger or schedule the initiation of the workflow.

Figure 7:
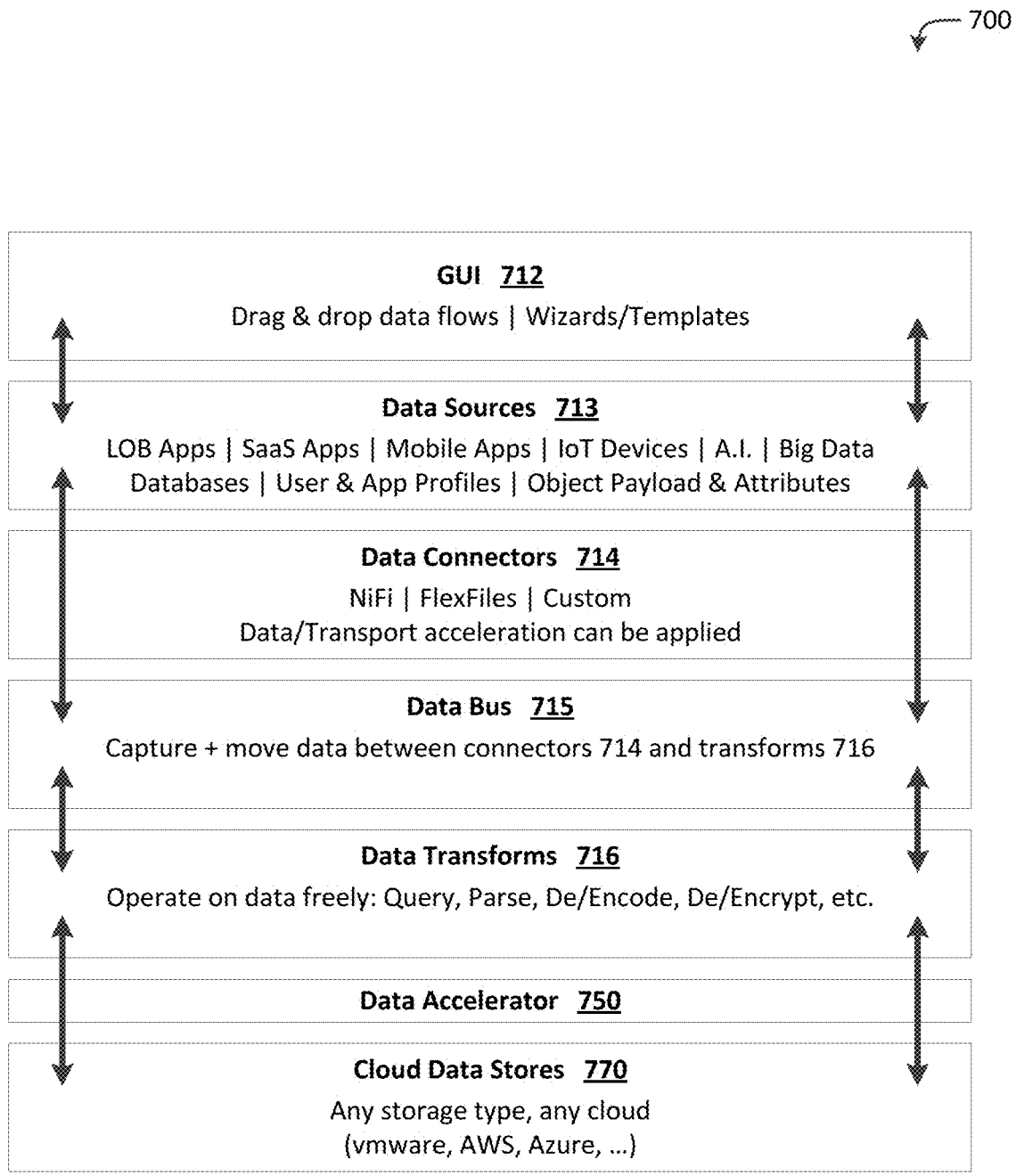
FIG. 7 is an exemplary data flow diagram for a flow-based data integration system of the present disclosure.

FIG. 7 depicts a data flow diagram 700 that is derived from architecture 600 of FIG. 6. Data flow diagram 700 includes some components which may be identical or substantially similar to a corresponding component in architecture 600. These include: GUI 712, which can correspond to GUI 612; Data Connectors 714, which can correspond to one or more of the processor libraries 614-618; Data Transforms 716, which can also correspond to one or more of the processor libraries 614-618; a Data Accelerator 750, which can correspond to the transport accelerator 650; and Cloud Data Stores 770, which can correspond to cloud OS services 670.

Two components are illustrated that do not necessarily have an equivalent depiction in the architecture 600 of FIG. 6: Data Sources 713 and Data Bus 715.

Data Bus 715 provides data transport or other communicative couplings within data integration system 610. For example, Data Bus 715 is used to couple Data Connectors 714 to Data Transforms 716 in desired upstream and downstream configurations (wherein these configurations and other parameters can be defined by a user via GUI 712, as described previously with respect to GUI 612). In some embodiments, Data Bus 715 can be powered by Apache NiFi.

The Data Sources 713 can comprise the locations (physical or virtual) where raw data or desired input data resides before being retrieved or ingested into the data integration system 610 for further operation. Data Sources 713 can include, but are not limited to: LOB Apps; SaaS Apps; Mobile Apps; IoT devices; A.I.; Big Data databases; User profiles; App profiles; data object payloads and attributes, and various other sources. Data Sources 713 can be remote or local to the other components depicted in data flow diagram 700. Note that bi-directional communication is depicted between Data Sources 713 and GUI 712: when a user inputs an identifier or pointer to a desired one of Data Sources 713, this identifier or pointer can be used to discover the available files and data objects that can be read. In some instances, one or more credentials might be required as additional user input to read certain files, or to access a listing or partition of secured files. From this data initially retrieved from the Data Sources 713, GUI 712 allows the user to define where the ingested data should be placed in the cloud, which here corresponds to Cloud Data Stores 770. With these definitions in place, the data migration and ingestion process desired by the user can then begin. However, in some embodiments no communication may occur at all between GUI 712 and Data Sources 713, in which case GUI 712 passes the user input of the data source identifier or pointer directly to the corresponding Data Connector 714 and any error conditions or required credentials can be handled at a later time.

As mentioned above, for each one of the Data Sources 713 a corresponding Data Connector 714 is provided for I/O operations to the data integration system 610. In particular, the Data Connectors 714 provide a communicative coupling or transport between Data Sources 713 and Data Bus 715—this linkage indicated by the double-ended vertical arrow passing through Data Connectors 714. In some instances, there may be a one-to-one correspondence between a given Data Source 713 and an associated Data Connector 714. In some embodiments, there may be a many-to-one correspondence, wherein multiple different Data Connectors 714 can perform I/O operations with a given Data Source 713, or wherein a single Data Connector 714 can perform I/O operations with multiple different Data Sources 713. Via these Data Connectors 714, data integration system 610 can be configured with an incredibly wide variety of data integrations, including but not limited to: file systems, Hadoop/HDFS, Redshift, HTTP(S), web services, SQL/noSQL, ZML, S3/Blob objects, custom integrations, etc. Regardless of the specific data integration that is desired or configured, Data Connectors 714 will ingest or receive data from the Data Sources 713 and normalize the ingested data into data objects, which are transmitted to one or more downstream Data Transforms 716 via the Data Bus 715.

The Data Transforms 716 can be the same as, or substantially similar to, the one or more of the data transforms from data integration processor library 614, system flow processor library 616, and custom processor library 618, as was described above. In some embodiments, the Data Transforms 716 might comprise only the system flow processor library 616. In some embodiments, the Data Transforms 716 might comprise only Apache NiFi FlowFile processors.

For a given workflow, a data object is output by a final Data Transform 716 (e.g. the terminal end of a chain of processor blocks) and transmitted to a desired Cloud Data Store 770, the location of which can be specified by a user via GUI 712. In some embodiments, the data object output by a final Data Transform 716 might first be passed to an appropriate one of the Data Connectors 714 corresponding to the desired Cloud Data Store 770. In some embodiments, cloud OS services 670 and/or cloud OS services REST APIs 672 as described previously might be utilized.

In some examples, a data accelerator can be, optionally, used to transmit data objects in an expedited manner and to minimize data loss. Data Accelerator 750 can be used in the transmission of the data object output from the final Data Transform 716 to the desired Cloud Data Store 770, such that the Data Accelerator 750 reduces the transmission latency, reduces packet loss, or both. In some embodiments, the Data Accelerator 750 can achieve up to a 20× improvement in bulk data transfer and global replication performance, particularly in instances where the transmission network is dirty and/or lossy. As mentioned previously, the Data Accelerator 750 can be the same or substantially similar to transport accelerator 650. In some embodiments, one or both of accelerator 650 and 750 can used the gambler-based method described with respect to FIGS. 1-5 previously, although other data and network optimization and acceleration techniques can optionally be employed in the context of the present disclosure. In some embodiments, the Data Accelerator 750 can be configured as a transparent layer between one or more data sources and/or data destinations, such that the Data Accelerator 750 intercepts TCP traffic on certain ports (which can be pre-defined in memory or automatically detected and configured by the data accelerator itself). For example, Data Accelerator 750 can intercept TCP traffic on NiFi-enabled ports, or on ports implementing the data integration system 610, or both. Because Data Accelerator 750 can be provided as a transparent layer, it can seamlessly be added as a proxy without requiring any coding or other configuration changes to the program whose data is intercepted and accelerated.

Figure 8:
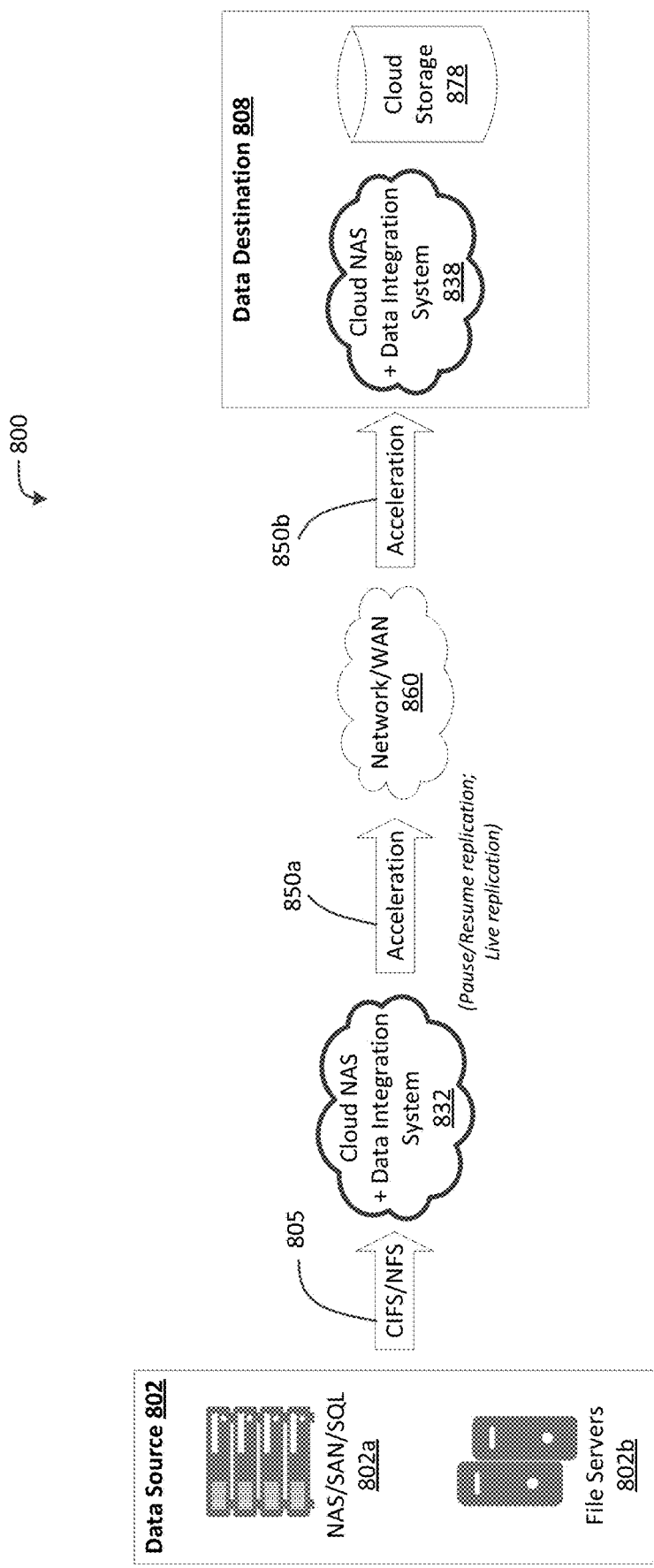
FIG. 8 is an exemplary one-to-one data migration and integration process according to an aspect of the present disclosure.
Figure 9:
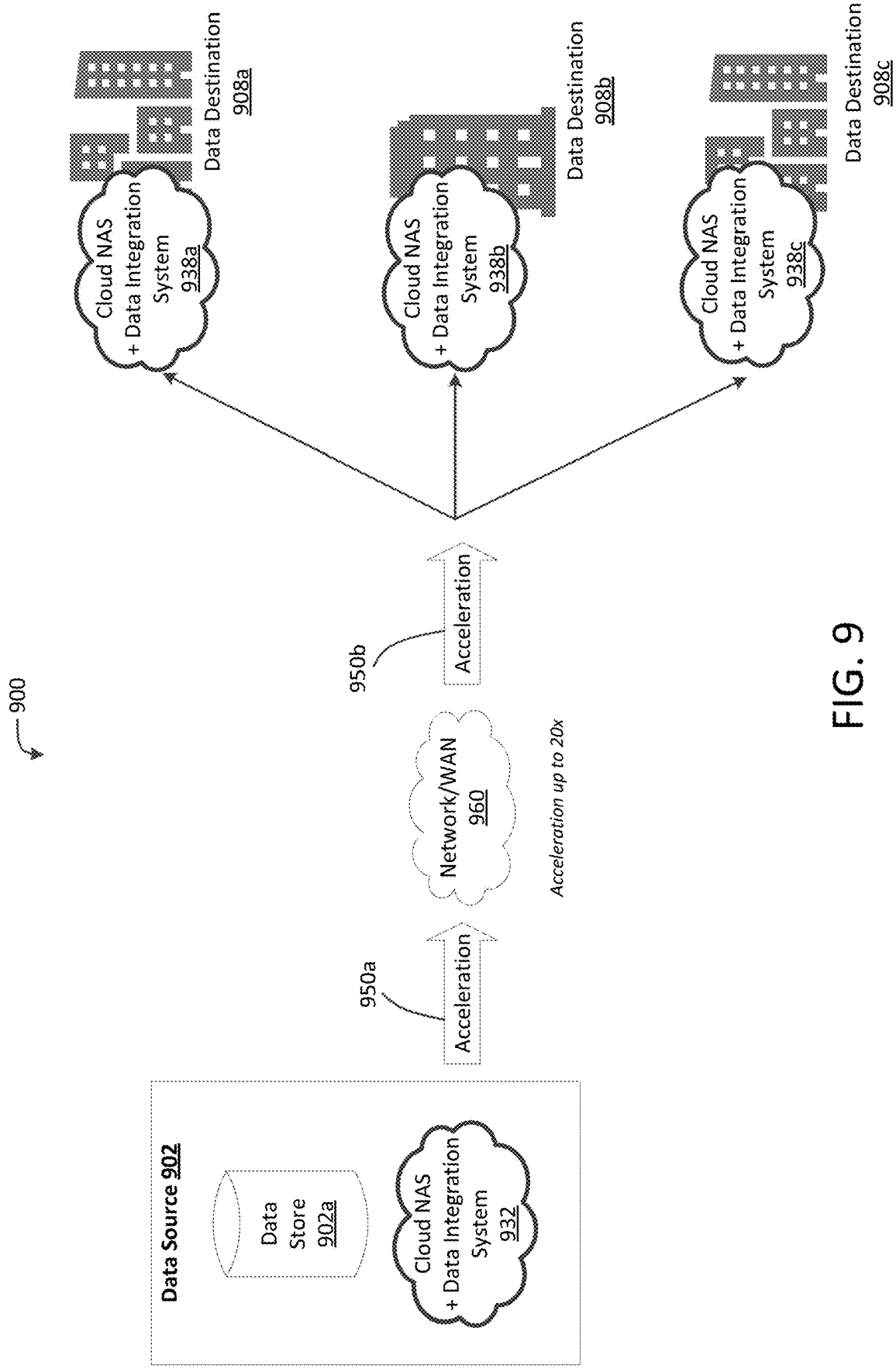
FIG. 9 is an exemplary one-to-many data migration and integration process according to an aspect of the present disclosure.
Figure 10:
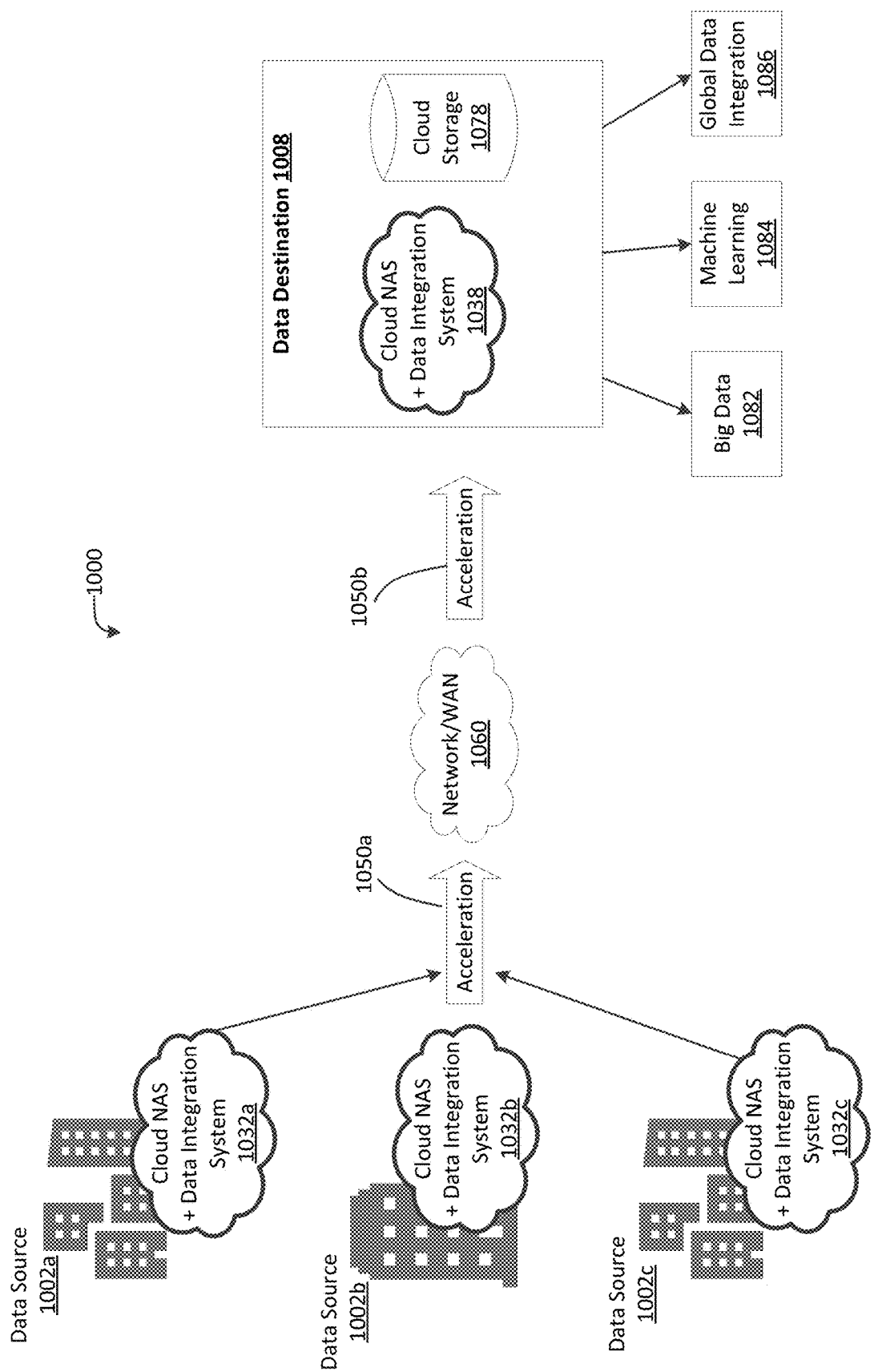
FIG. 10 is an exemplary many-to-one data migration and integration process according to an aspect of the present disclosure.

The disclosure turns now to a discussion of FIGS. 8-10, which provide example use cases and implementations of the architecture 600 or of architectures similar to architecture 600, wherein modifications from architecture 600 are contemplated without departing from the scope of the present disclosure. For example, the following figures each depict Cloud NAS nodes (such as file system 630, which can be a cloud NAS) that are combined with a data integration system (such as data integration system 610), such that the enhanced data transfer capabilities that are afforded by the data integration system 610 and its processor libraries can be utilized, in some embodiments, on a fully end-to-end basis. In some embodiments, one or more of the Cloud NAS nodes described below can be provided via virtual machines or virtualization platforms and environments. In some embodiments, other file systems or file servers can be used in place of the Cloud NAS nodes.

FIG. 8 depicts a one-to-one data migration and integration process 800, which can be user-created via flow editor 612b or can be user-customized via a template of wizard 612a (e.g. the depicted one-to-one data migration and integration process 800 can be stored as one or more templates within the data store of templates 613). In general, such this one-to-one data migration and integration process 800 can be employed by users wishing to move existing data that is not in the cloud, into the cloud. Often times, locally and/or physically stored data sets are quite large in size, ranging from several terabytes (TB) to several petabytes (PB) and beyond. Accordingly, the migration of such large data sets can be very cumbersome, challenging, slow, and error-prone. Advantageously, the use of the presently disclosed data integration system can address each of these shortcomings.

In this particular illustrated example, a user desires to move data from a data source 802 to a remote data destination 808 (i.e. a one-to-one data migration). As depicted, data source 802 comprises a NAS/SAN/SQL 802a and legacy file servers 802b, although other data sources can also be utilized, such as a net app or Windows server. Data destination 808 is shown as comprising cloud storage 878, although non-cloud storage can also be utilized.

As a particular example, consider that data source 802 consists of a NAS 802a and legacy file servers 802b that are located in or associated with the Korean office of an international corporation, and this international corporation desires to transfer all of this legacy data from the Korean office and into a cloud environment hosted in the United States, in Virginia. Adding such a long transfer distance on top of an already complex migration process for a large data set (several TB-PB or higher) is normally associated with many difficulties, but such difficulties are advantageously not present in the system and method of the instant disclosure. In order to provide this data migration, a first Cloud NAS node 832 is associated with data source 802 of the Korean office, and a second Cloud NAS node 838 is associated with data destination 808, the Virginia-based cloud environment. In some embodiments, this association might comprise co-location (e.g. node 832 and data source 802 are both in the Korean office; node 838 and data destination 808 are both in the Virginia cloud data center). In some embodiments, this association might be remote, but based on factors like proximity, latency, availability, etc. (e.g. node 832 is in China and data source 802 is in the Korean office; node 838 is in Maryland and data destination 808 is in the Virginia cloud data center). Other such association arrangements can be employed without departing from the scope of the present disclosure.

The data source, data destination, and any desired data transform and other migration parameters are specified via GUI 612 of data integration system 610, as has been described above. Note that in this example, data integration system 610 runs on both the first and second Cloud NAS nodes 832, 838. From here, the data migration from the Korean office to the US cloud environment begins. The first Cloud NAS node 832 connects to data source 802 and begins ingesting data using data connectors stored in the processing block libraries 614-618 of data integration system 610. This is indicated as a data ingestion 805, which can take place using various file system protocols and storage standards as needed, so long as the appropriate data connector is provided in the processing block libraries.

Once ingested to first Cloud NAS node 832, the ingested data can be normalized into data objects and transformed as desired via the data integration system 610 running on or otherwise accessible to the first Cloud NAS node 832. The transformed data is then accelerated through a network/WAN 860 (such as the Internet or an Intranet) to the second Cloud NAS node 838 associated with the data destination 808. This acceleration is shown as a first acceleration 850a delivering the data to network/WAN 860 and a second acceleration 850b delivering the data from network/WAN 860 to the second Cloud NAS node 838. Once received at second Cloud NAS node 838, the data migration can be completed by transferring the received data into cloud storage 878 (or some other desired storage destination). In some embodiments, the cloud storage 878 can be provided as the file system 630 of FIG. 6 (e.g. a cloud NAS), as a third-party public or private cloud accessed via cloud OS services 670 and/or the cloud OS REST APIs 672, or can be provided in some other configuration as desired. In some embodiments, additional data transform processing blocks could be applied to one or more data objects of the received data before they are migrated to their final destination.

Regardless of how the processing burden is divided, the use of data integration system 610 and the Cloud NAS nodes 832, 838 permits a large and complex data migration process to be easily configured by a user to be executed automatically via the series of processing blocks stored in the processing block libraries 614-618. Additionally, this flow-based processing block workflow permits the data migration to be paused and resumed as desired, and further still, can permit the data migration to be performed on live production data, creating and maintaining a complete synchronized copy of the live production data located. Continuing the previous example, an initial copy of the live production data stored in data source 802 at the Korean office is fully migrated to form a synchronized cloud copy in the cloud storage 878 in Virginia. However, any users or individuals seeking to access the live production data will still be directed to data source 802 in Korea. The one-to-one data migration process 800 continues to run, and any time a change is detected in the live production data stored in data source 802 in Korea, the changes will be ingested to a data connector processor block of the first Cloud NAS node 832, then accelerated and delivered to the second Cloud NAS node 838 where the change data is written to cloud storage 878 in Virginia. Advantageously, due to the acceleration 850a,b, any errors in user migration or handoff to the synchronized cloud copy at cloud storage 878 can be minimized or reduced entirely. Once all users are migrated, the live production data at data source 802 is no longer needed and a seamless migration of both data and users/customers has been achieved.

FIG. 9 depicts a one-to-many data integration or migration process 900, which alternatively can be considered a content publishing arrangement that is implemented from a data source 902 to multiple data destinations 908a-c. In some embodiments, data source 902 can be a cloud environment. In some embodiments, data source 902 can be identical or substantially similar to data source 802 of FIG. 8, wherein data is migrated from legacy hardware to the cloud. However, where FIG. 8 depicted this data being migrated to a single cloud location, FIG. 9 depicts this data being migrated to three different cloud locations, which may or may not be similar to the data destination 808 of FIG. 8. Additionally, multiple different types of cloud environments or cloud storage systems could be employed in the context of this one-to-many data migration and integration process 900, e.g. a copy of the migrated data received at a first destination Cloud NAS node 938a might be transferred to a high performance, high-availability, hot storage type cloud environment; a copy of the migrated data received at a second destination Cloud NAS node 938b might be transferred to a medium performance cool storage type cloud environment; and a copy of the migrated data received at a third destination Cloud NAS node 938c might be transferred to a low-performance, high-availability cold storage type cloud environment. In some embodiments, the migrated data could be mirrored at each of the different cloud locations, as described above, or the migrated data could be partitioned amongst the different cloud locations, with or without any partition overlap, still in accordance with the possibility of employing multiple different types of cloud environments. In some embodiments, various aspects of the one-to-many data migration or integration can be encoded in one or more of the flow-based templates 613 of the data integration system 610. Similarly, various aspects of the content publishing arrangement can likewise be encoded in one or more of the flow-based templates 613.

In some embodiments, rather than data source 902 being provided as a legacy data store that needs to be migrated to the cloud, data source 902, and more particularly, the data store 902a can itself be a cloud environment, which is illustrated as being associated with a source Cloud NAS node 932. In this example, both the data source 902 and the data destinations 908a-c are already cloud environments and migration is not needed. Instead, the aforementioned content publishing functionality can be desired. The source Cloud NAS node 932 might be associated with the headquarters of a large sales organization that generates on a bi-weekly basis a 1 TB+ image consisting of the most recent performance numbers, additional product documentation, multimedia advertisement files, etc. The headquarters desires to transmit this file to all of its 100+ local branches, which are located in various countries and continents around the world. Traditional delivery options such as email or file sharing are too slow, cumbersome, expensive, or otherwise undesirable. However, via the content publishing mechanism depicted in FIG. 9, this 1 TB+ image file could be quickly and automatically published to destination Cloud NAS nodes (such as nodes 938a-c) that are associated with the local branches and perform the final delivery of the image to each of the 100+ local branches. In some embodiments, the data integration system 610 could be configured with one or more data connector blocks on the source Cloud NAS node 932 that constantly are pointed to a folder or location containing the 1 TB+ image, such that any changes or updates can automatically be detected, ingested, and published to the destination Cloud NAS nodes 938 of the local branches.

FIG. 10 depicts a many-to-one data migration and integration process 1000 which alternatively can be considered a content aggregation arrangement that is implemented from multiple data sources 1002a-c to a single data destination 1008. In some embodiments, data destination 1008 can be cloud-based and identical or substantially similar to data destination 808 of FIG. 8, which received data migrated from legacy sources. In some embodiments, one or more of the data sources 1002a-c may be similar to the legacy data source 802 of FIG. 8, although in some embodiments one or more of the data sources 1002a-c may be cloud environments. Additionally, multiple different types of cloud environments or cloud storage systems can be employed in the context of this many-to-one data migration and integration process 1000. For example, the first data source 1002a might be telemetry data collected from a factory in Asia, wherein this telemetry data is detected, ingested, normalized, transformed, and transmitted (using data transport accelerator 1050a,b) by a first source Cloud NAS node 1032a to a single centralized destination Cloud NAS node 1038; the second data source 1002b might be an internal file server of a Q&A department located at a warehouse in Germany, wherein these Q&A files are detected, ingested, normalized, transformed, and transmitted by second source Cloud NAS node 1032b to the single centralized destination Cloud NAS node 1038; and the third data source 1002c might be an SaaS application used by the salesforce team in North America, wherein the SaaS application data is detected, ingested, normalized, transformed, and transmitted by third source Cloud NAS node 1032c to the single centralized destination Cloud NAS node 1038. As demonstrated in the context of this example, particular benefits and advantages of the many-to-one data integration process 1000 can be achieved when deployed across different locations or data sources of a single organization, as the automated and efficient collection and centralization of data from disparate and far-flung data sources can enable correlations and analyses that previously would not have been possible due to the lack of data availability or the overhead and complexity involved in obtaining any desired data. For example, the factory production telemetry data from China can be analyzed and correlated with defects and returns that were reported to the Q&A department of the Germany warehouse, and can be further analyzed and correlated with customer complaints and feedback that were logged in the SaaS application used by the North American sales team. To illustrate the further analyses that can be enabled by this automatic and often near-instantaneous centralization of data, FIG. 10 depicts a big data system 1082, a machine learning system 1084, and a global data integration system 1086, each of which can be coupled to this centralized data for purposes of providing specific, highly directed, and specialized analyses and correlations. Note that these additional systems 1082-1086 can in some embodiments access the centralized data directly from cloud storage 1078, or can request and access the centralized data through the destination Cloud NAS node 1038 that is associated with cloud storage 1078. In other embodiments, destination Cloud NAS node 1038 can control the transmission of the centralized data to any additional systems or components, wherein each transmission destination or type of transmission destination is associated with at least one compatible data connector processor block stored in the processor libraries 614-618 of data integration system 610.

Figure 11B:
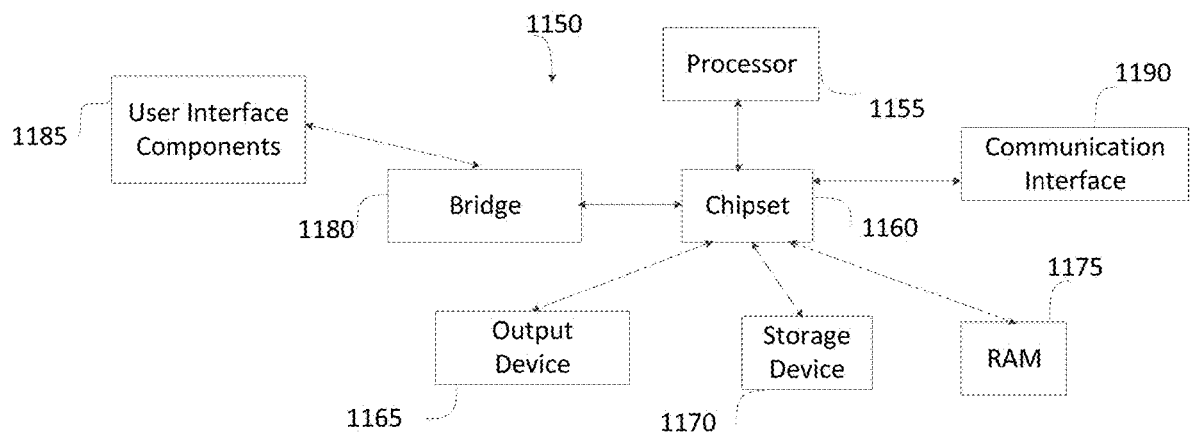
FIG. 11B shows an exemplary possible system example for implementing various examples of the present technology.
Figure 11A:
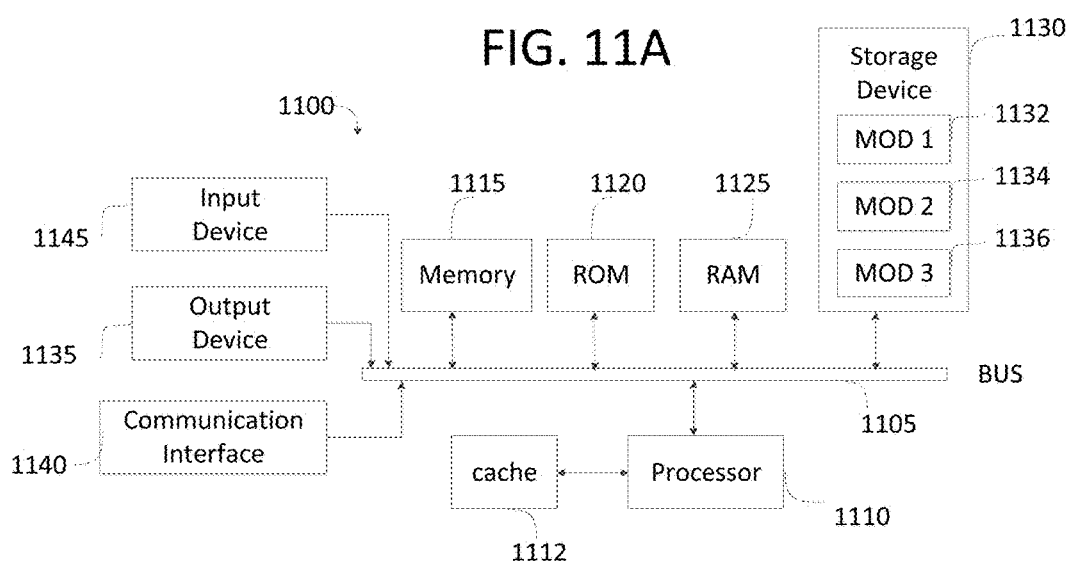
FIG. 11A shows an exemplary possible system example for implementing various examples of the present technology.

FIG. 11A and FIG. 11B illustrate example system embodiments. The more appropriate embodiment will be apparent to those of ordinary skill in the art when practicing the present technology. Persons of ordinary skill in the art will also readily appreciate that other system embodiments are possible. FIG. 11A illustrates a conventional system bus computing system architecture 1100 wherein the components of the system are in electrical communication with each other using a bus 1105. Exemplary system 1100 includes a processing unit (CPU or processor) 1110 and a system bus 1105 that couples various system components including the system memory 1115, such as read only memory (ROM) 1120 and random access memory (RAM) 1125, to the processor 1110. The system 1100 can include a cache of high-speed memory connected directly with, in close proximity to, or integrated as part of the processor 1110. The system 1100 can copy data from the memory 1115 and/or the storage device 1130 to the cache 1112 for quick access by the processor 1110. In this way, the cache can provide a performance boost that avoids processor 1110 delays while waiting for data. These and other modules can control or be configured to control the processor 1110 to perform various actions. Other system memory 1115 may be available for use as well. The memory 1115 can include multiple different types of memory with different performance characteristics. The processor 1110 can include any general purpose processor and a hardware module or software module, such as module 1 1132, module 2 1134, and module 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software modules 1132, 1134, 1136 for controlling the processor 1110. Other hardware or software modules are contemplated. The storage device 1130 can be connected to the system bus 1105. In one aspect, a hardware module that performs a particular function can include the software component stored in a computer-readable medium in connection with the necessary hardware components, such as the processor 1110, bus 1105, display 1135, and so forth, to carry out the function.

FIG. 11B illustrates an example computer system 1150 having a chipset architecture that can be used in executing the described method and generating and displaying a graphical user interface (GUI). Computer system 1150 is an example of computer hardware, software, and firmware that can be used to implement the disclosed technology. System 1150 can include a processor 1155, representative of any number of physically and/or logically distinct resources capable of executing software, firmware, and hardware configured to perform identified computations. Processor 1155 can communicate with a chipset 1160 that can control input to and output from processor 1155. In this example, chipset 1160 outputs information to output device 1165, such as a display, and can read and write information to storage device 1170, which can include magnetic media, and solid state media, for example. Chipset 1160 can also read data from and write data to RAM 1175. A bridge 1180 for interfacing with a variety of user interface components 1185 can be provided for interfacing with chipset 1160. Such user interface components 1185 can include a keyboard, a microphone, touch detection and processing circuitry, a pointing device, such as a mouse, and so on. In general, inputs to system 1150 can come from any of a variety of sources, machine generated and/or human generated.

Chipset 1160 can also interface with one or more communication interfaces 1190 that can have different physical interfaces. Such communication interfaces can include interfaces for wired and wireless local area networks, for broadband wireless networks, as well as personal area networks. Some applications of the methods for generating, displaying, and using the GUI disclosed herein can include receiving ordered datasets over the physical interface or be generated by the machine itself by processor 1155 analyzing data stored in storage 1170 or 1175. Further, the machine can receive inputs from a user via user interface components 1185 and execute appropriate functions, such as browsing functions by interpreting these inputs using processor 1155.

It can be appreciated that example systems 1100 and 1150 can have more than one processor 1110 or be part of a group or cluster of computing devices networked together to provide greater processing capability.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of a set indicates that one member of the set or multiple members of the set satisfy the claim.

We claim:

1. A method comprising:
receiving a selection of a plurality of data processor blocks and a configuration mapping, the configuration mapping corresponding to one or more inputs and outputs of each data processor block;
initiating, at a first compute node associated with a selected data source, an automated data flow, the automated data flow generated from the configuration mapping and comprising a continuous sequence of the selected plurality of data processor blocks arranged in an order specified by input and output relationships contained in the configuration mapping;
ingesting, from the selected data source and into a first data processor block of the automated data flow, at least a portion of the data stored in the selected data source; and
transforming the ingested data with the continuous sequence of data processor blocks, such that:
the first data processor block applies a first transformation operation to the ingested data, thereby generating and outputting a first transformed data;
a second data processor block of the continuous sequence receives the first transformed data and applies a second transformation operation to the first transformed data, thereby generating and outputting a second transformed data, wherein:
the second data processor block is coupled to the first data processor block according to the input and output relationships contained in the configuration mapping;
the second transformation operation is different from the first transformation operation; and
neither the first nor second transformation operation comprises data acceleration.

2. The method of claim 1, further comprising receiving an input specifying one or more of the selected data source, the selected data destination, and a data transform parameter.

3. The method of claim 1, wherein the selection of the plurality of data processor blocks and the configuration mapping comprises a selection of a pre-defined template.

4. The method of claim 1, wherein the selection of the plurality of data processor blocks and the configuration mapping comprises receiving a plurality of user inputs into a drag and drop graphical user interface (GUI).

5. The method of claim 1, wherein the plurality of data processor blocks are flow-based programming processor blocks.

6. The method of claim 1, wherein the plurality of data processor blocks are Apache NiFi FlowFile processors.

7. The method of claim 1, wherein the automated data flow comprises:
the first data processor block at an input end of the continuous sequence of data processor blocks;
a final data processor block at an output end of the continuous sequence of data processor blocks; and
one or more data transform data processor blocks disposed between the input and output ends of the continuous sequence of data processor blocks.

8. The method of claim 7, wherein the first data processor block is configured to:
couple to the selected data source and ingest the data;
normalize the ingested data into a data object; and
transmit the data object to the one or more data transform data processor blocks.

9. The method of claim 1, wherein:
one or more of the first compute node, the second compute node, and the selected data source comprises one or more of: a cloud NAS (Network-Attached Storage), a NAS, a SAN (Storage Area Network), a SQL (Structured Query Language) database, a local environment, and a file server.

10. The method of claim 1 wherein the automated data flow is stored as a pre-defined template for a one-to-one data migration, wherein the pre-defined template comprises at least the plurality of data processor blocks and a configuration mapping for the plurality of data processor blocks.

11. The method of claim 1, wherein the automated data flow is stored as a pre-defined template comprising at least the plurality of data processor blocks and a configuration mapping for the plurality of data processor blocks, and wherein the automated data flow comprises one or more of:
a one-to-many data transfer;
a many-to-one data transfer;
a spoke-and-hub data transfer; and
a graph topology based data transfer.

12. The method of claim 1, wherein the data accelerator comprises a data storage accelerator and a data transport accelerator and wherein the data acceleration is based at least in part on one or more of measured network latency characteristics and measured network packet loss characteristics.

13. The method of claim 12, wherein the data accelerator acts as a proxy to intercept one or more TCP packets transmitted by the data source and to perform a data accelerated transmission of the one or more TCP packets to the data destination.

14. The method of claim 13, wherein the one or more TCP packets are intercepted based on at least their port number.

15. The method of claim 1, wherein the data accelerator performs data acceleration by:
initiating a generation of a plurality of gamblers;
initiating a gambler of the generation;
transmitting one or more packets for the gambler over a network;
in response to a determination the gambler is finished, waiting for the network to discharge; and
in response to a determination the generation is finished, determining a gain-loss of the generation and adjust the plurality of gamblers.

16. The method of claim 15, further comprising: in response to a determination that the gambler is not finished, transmitting additional packets over the network.

17. The method of claim 15, further comprising: in response to a determination that the generation is not finished, incrementing to a next gambler.

18. The method of claim 17, further comprising
initiating the next gambler of the generation;
transmitting one or more packets for the next gambler over the network;
in response to a determination that the gambler is finished, waiting for the network to discharge; and
in response to a determination that the gambler is finished, determining a gain-loss of the generation and adjusting the plurality of gamblers.

19. The method of claim 15, wherein the one or more packets are transmitting at a gambler specified transmission rate.

20. The method of claim 15, wherein the plurality of gamblers are adjusted by incrementing a transmission rate to be closer to an inherent network loss rate.

21. The method of claim 20, wherein the inherent network loss rate is determined by transmitting a probe loss packet after the network is discharged.

22. The method of claim 15, wherein the data accelerator comprises one or more hardware circuits for performing the data acceleration.

\* \* \* \* \*